United States Patent
Du et al.

(10) Patent No.: US 11,962,097 B2
(45) Date of Patent: Apr. 16, 2024

(54) METHOD AND APPARATUS FOR SELECTING ANTENNA ELEMENTS OF AN ANTENNA ARRAY

(71) Applicant: NOKIA SOLUTIONS AND NETWORKS OY, Espoo (FI)

(72) Inventors: Jinfeng Du, Windsor, NJ (US); Marcin Rybakowski, Rawicz (PL); Kamil Bechta, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 300 days.

(21) Appl. No.: 17/603,716

(22) PCT Filed: Apr. 16, 2019

(86) PCT No.: PCT/IB2019/053142
§ 371 (c)(1),
(2) Date: Oct. 14, 2021

(87) PCT Pub. No.: WO2020/212730
PCT Pub. Date: Oct. 22, 2020

(65) Prior Publication Data
US 2022/0200146 A1  Jun. 23, 2022

(51) Int. Cl.
*H01Q 3/36* (2006.01)
*H01Q 21/29* (2006.01)
(Continued)

(52) U.S. Cl.
CPC ............... *H01Q 3/36* (2013.01); *H01Q 21/29* (2013.01); *H04B 7/0691* (2013.01); *H04B 7/086* (2013.01); *H04B 7/0874* (2013.01)

(58) Field of Classification Search
CPC .......... H01Q 3/36; H01Q 21/29; H04B 7/086; H04B 7/0874; H04B 7/0691
See application file for complete search history.

(56) References Cited

U.S. PATENT DOCUMENTS 6,653,973 B2    11/2003  Yu
6,801,790 B2 *  10/2004  Rudrapatna ............ H01Q 1/246
                                                              455/562.1
(Continued)

FOREIGN PATENT DOCUMENTS

CN    102362439 A   2/2012
CN    108463952 A   8/2018
(Continued)

OTHER PUBLICATIONS

"3rd Generation Partnership Project; Technical Specification Group Radio Access Network; Study on 3D channel model for LTE (Release 12)", 3GPP TR 36.873 v12.7.0, (Dec. 2017), 47 pages.
(Continued)

*Primary Examiner* — Khai M Nguyen
(74) *Attorney, Agent, or Firm* — ALSTON & BIRD LLP

(57) ABSTRACT

A method, apparatus and computer program product are provided to select a plurality of antenna elements of an antenna array, such as to match the angular spread of the antenna array to a deployment scenario, thereby increasing the effective beamforming gain. In the context of a method, a plurality of antenna elements of an active antenna array are selected by separately selecting first, second and third pluralities of antenna elements and obtaining measures of first, second and third signals based upon transmission or reception of signals by the first, second and third pluralities of antenna elements, respectively The method additionally includes processing the measures of the first, second and third signals and determining a sub-array of antenna elements of the active antenna array to be utilized based on the processing of the measures of the first, second and third signals.

20 Claims, 16 Drawing Sheets

(51) Int. Cl.
    *H04B 7/06* (2006.01)
    *H04B 7/08* (2006.01)

(56) References Cited

U.S. PATENT DOCUMENTS

| | | | |
|---|---|---|---|
| 7,505,788 | B1 | 3/2009 | Narasimhan |
| 8,619,894 | B1 | 12/2013 | Thomas et al. |
| 8,754,810 | B2 | 6/2014 | Guo et al. |
| 9,806,777 | B1 | 10/2017 | Doostnejad et al. |
| 11,075,674 | B2 | 7/2021 | Hakola et al. |
| 2005/0075081 | A1 | 4/2005 | Catreux-Erceg et al. |
| 2005/0287962 | A1 | 12/2005 | Mehta et al. |
| 2010/0246496 | A1 | 9/2010 | Yurugi et al. |
| 2011/0169613 | A1 | 7/2011 | Chen et al. |
| 2012/0033761 | A1 | 2/2012 | Guo et al. |
| 2012/0106613 | A1 | 5/2012 | Piazza et al. |
| 2013/0120191 | A1 | 5/2013 | Zhang et al. |
| 2013/0301454 | A1 | 11/2013 | Seol et al. |
| 2017/0012359 | A1 | 1/2017 | Jung et al. |
| 2017/0238297 | A1* | 8/2017 | Benjebbour ............ H04L 5/005 370/329 |
| 2017/0257884 | A1 | 9/2017 | Rahman et al. |
| 2017/0331531 | A1 | 11/2017 | Wu |
| 2017/0331577 | A1 | 11/2017 | Parkvall et al. |
| 2018/0048364 | A1 | 2/2018 | Girnyk et al. |
| 2018/0227928 | A1 | 8/2018 | Kim et al. |
| 2018/0316402 | A1 | 11/2018 | Jalden et al. |

FOREIGN PATENT DOCUMENTS

| | | |
|---|---|---|
| CN | 108702189 A | 10/2018 |
| WO | WO 2016/018259 A1 | 2/2016 |
| WO | WO 2017/195183 A1 | 11/2017 |

OTHER PUBLICATIONS

"3rd Generation Partnership Project; Technical Specification Group Radio Access Network; Study on channel model for frequencies from 0.5 to 100 GHz (Release 14)", 3GPP TR 38.901 v14.3.0, (Dec. 2017), 91 pages.

"3rd Generation Partnership Project; Technical Specification Group Radio Access Network; Study on new radio access technology: Radio Frequency (RF) and co-existence aspects (Release 14)" 3GPP TR 38.803 v14.2.0, (Sep. 2017), 205 pages.

Chizhik et al., "Path loss, beamforming gain and time dynamics measurements at 28 GHz for 90% indoor coverage", arxiv: 1712.06580, (Dec. 2017), 29 pages.

Du et al., "Gbps User Rates Using mmWave Relayed Backhaul With High-Gain Antennas", IEEE Journal on Selected Areas in Communications, vol. 35, Issue 6, (Jun. 2017), 10 pages.

Du et al., "Suburban Fixed Wireless Access Channel Measurements and Models at 28 GHz for 90% Outdoor Coverage", arxiv: 1807.03763, (Jul. 2018), 9 pages.

Greenstein et al., "Gain reductions due to scatter on wireless paths with directional antennas", IEEE Communications Letters, vol. 3, Issue 6, (Jun. 1999), 3 pages.

International Search Report and Written Opinion for Patent Cooperation Treaty Application No. PCT/IB2019/053142 dated Jan. 28, 2020, 18 pages.

Karamalis et al., "Adaptive Antenna Subarray Formation for MIMO Systems", IEEE Transactions on Wireless Communications, vol. 5, No. 11, (Nov. 2006), 6 pages.

Karamalis et al., "Selecting Array Configurations for MIMO Systems: An Evolutionary Computation Approach", IEEE Transactions on Wireless Communications, vol. 3, Issue 6, (Nov. 2004), 5 pages.

Roh et al., "Millimeter-Wave Beamforming as an Enabling Technology for 5G Cellular Communications: Theoretical Feasibility and Prototype Results", IEEE Communications Magazine, (Feb. 2014), 8 pages.

Seleem et al., "Hybrid Precoding-Beamforming Design with Hadamard RF Codebook for mmWave Large-Scale MIMO Systems", IEEE Access, vol. 5, (Mar. 28, 2017), 11 pages.

Singh et al., "On The Feasibility of Codebook-Based Beamforming in Millimeter Wave Systems With Multiple Antenna Arrays", IEEE Transactions on Wireless Communications, vol. 14, No. 5, (May 2015), 14 pages.

Song et al., "Multi-Panel Based Hybrid Beamforming For Multi-User Massive MIMO", GLOBECOM 2017—2017 IEEE Global Communications Conference, (Dec. 4-8, 2017), 6 pages.

Song et al., "Two-Level Spatial Multiplexing Using Hybrid Beamforming Antenna Arrays for mmWave Communications", arXiv: 1607.08737, (Jul. 2016), 29 pages.

Wang et al., "Reconfigurable Adaptive Array Beamforming by Antenna Selection", IEEE Transactions on Signal Processing, vol. 62, Issue 9, (May 1, 2014), 12 pages.

Zhang et al., "Massive Hybrid Antenna Array for Millimeter-Wave Cellular Communications", IEEE Wireless Communications, vol. 22, Issue 1, (Feb. 2015), 9 pages.

First Examination Report for Indian Application No. 202117050978 dated Sep. 12, 2022, 7 pages.

Office Action for Chinese Application No. 201980097245.1 dated Oct. 17, 2023, 15 pages.

Office Action for European Application No. 19723214.3 dated Nov. 23, 2023, 5 pages.

* cited by examiner

METHOD AND APPARATUS FOR SELECTING ANTENNA ELEMENTS OF AN ANTENNA ARRAY

CROSS-REFERENCE TO RELATED APPLICATIONS

This application is a national phase entry of International Application No. PCT/IB2019/053142, filed Apr. 16, 2019, the entire contents of which are incorporated herein by reference.

TECHNOLOGICAL FIELD

A method, apparatus and computer program product are provided in accordance with an example embodiment in order to select a plurality of antenna elements of an antenna array, such as based upon an angular spread of signals transmitted and/or received by the antenna array following deployment in order to provide for improved beamforming gain.

BACKGROUND

As communication systems evolve, new frequency bands are utilized. For example, fifth generation (5G) communication systems will utilize a millimeter wave frequency band so as to satisfy the capacity demand of mobile broadband applications. As a result of the use of relatively high frequencies, such as those in the millimeter wave frequency band, however, it may be challenging to provide a desired level of service without shrinking the traditional cell coverage range as a result of increased path loss, increased sensitivity to blockages and/or radio frequency (RF) and analog-to-digital (ADC)/digital-to-analog (DAC), hardware limitations.

In order to combat the high attenuation that will otherwise occur within the millimeter wave frequency band, to reliably deliver signals over a long distance at a gigabit per second (Gbps) rate utilizing the millimeter wave frequency band and/or to provide coverage in areas without line of sight (LOS), that is, in a non-line of sight (NLOS) area, a relatively high beamforming gain is desirable. However, fully digital beamforming that could provide the high beamforming gain is costly and analog beamforming or a hybrid of digital and analog beamforming with a limited number of RF chains will typically be utilized to support communications using a millimeter wave frequency band. Due to the angular spread of the signals and the limited number of RF chains, however, the effective bandwidth of an antenna will be widened, thereby generally resulting in a reduced effective beamforming gain.

More particularly, an antenna array includes a plurality of antenna elements with the number of elements designated N and the per-element gain in decibels relative to an isotropic antenna (dBi) designated $G_e$. In an instance in which the antenna system includes as many RF chains as the number of antenna elements and in which perfect channel state information (CSI) is provided, generalized beamforming will provide gain, in terms of an absolute value, that grows linearly with the number of antenna elements. That is, unless the size of the antenna array is smaller than the beam itself, the ideal total antenna gain G, e.g., the nominal gain of the antenna array, can be defined as:

$$G = 10 \log_{10}(N) + G_e \text{ [dBi]}, \quad (1)$$

However, as the number of RF chains of the antenna system is generally limited and since perfect channel state information is generally unavailable, the gain described above in conjunction with generalized beamforming is generally unable to be obtained. Instead, a beam steering approach, such as analog beamforming, may be utilized. In ideal cases, such as in free space or in an anechoic chamber in which there is no angular spread of the signals, the beam pattern of an antenna array will be preserved and the effective gain will equal the nominal gain of the antenna which would be observed in an anechoic chamber. However, in typical deployment scenarios, there are many structures or other features that scatter the signal and the antenna beam pattern will be widened by scattering and/or diffusion such that the associated effective gain is smaller than the nominal gain. As a result, as the number of antenna elements increases, the effective beamforming gain will typically saturate at a limit imposed by the angular spread of the signal channel.

By way of example, high gain antennas have a beam pattern that is approximately characterized by Gaussian functions both in azimuth and in elevation. For an antenna with root-mean-square (RMS) elevation beamwidth $B_v$ and RMS azimuth beamwidth $B_h$, in radius, the gain pattern may be defined for an azimuth angle $\phi$ and an elevation angle $\theta$ as follows:

$$g(\phi, \theta) = \frac{2}{B_h B_v} e^{-\frac{\phi^2}{2B_h^2}} e^{-\frac{\theta^2}{2B_v^2}}. \quad (2)$$

In the absence of scattering, the RMS beamwidths are set, correspondingly, to the nominal beamwidths $B_{v0}$ and $B_{h0}$, which can be determined from a measured beam pattern in an anechoic chamber. For an antenna array of N elements, with each antenna element having a directional gain, also referenced as an antenna element gain $G_e$ that is linear in power, the maximum gain related to the antenna RMS beamwidths is defined as follows:

$$g_{max} = \frac{2}{B_h B_v} = N G_e. \quad (3)$$

This definition of the maximum gain allows the determination of effective beamwidths of an antenna array in the presence of channel angular spread induced by scattering with the effective antenna pattern being provided by a convolution of the ideal antenna pattern and a channel power angular spectrum. For example, assuming a Gaussian channel angular spectrum of azimuthal angular spread (ASD) $\sigma_h$ and elevation angular spread (ZSD) $\sigma_v$, the resulting effective antenna pattern continues to have a Gaussian form, but has effective widths as defined below:

$$B_v = \sqrt{B_{v0}^2 + \sigma_v^2}, \; B_h = \sqrt{B_{h0}^2 + \sigma_h^2}. \quad (4)$$

This definition of the effective widths is generally appropriate for relatively narrow antenna beams and angular spreads including those typically utilized by communication systems, such as 5G systems.

A mean angular spread varies in azimuth and elevation for different environments. For example, Table 1 provides the mean azimuth angle of departure spread (ASD) for a base station (BS) antenna and the mean azimuth angle of arrival spread (ASA) for an antenna of the user equipment (UE) for signals having a frequency of 28 gigahertz (GHz) in different deployment scenarios, such as an urban micro (UMi) street canyon, an urban macro (UMa) scenario, a rural macro (RMa) scenario or an indoor hotspot (InH) as specified in the 3$^{rd}$ Generation Partnership Project (3GPP) TR 38.901 technical report (TR).

TABLE 1

|  | UMi | | UMa | | RMa | | InH | |
| --- | --- | --- | --- | --- | --- | --- | --- | --- |
|  | LOS | NLOS | LOS | NLOS | LOS | NLOS | LOS | NLOS |
| BS ASD [deg] | 14 | 16 | 17 | 22 | 8 | 9 | 40 | 42 |
| UE ASA [deg] | 41 | 49 | 65 | 49 | 33 | 33 | 32 | 50 |

Additionally, the mean of the elevation angle of departure spread (ZSD) for the base station antenna and the elevation angle of arrival spread (ZSA) for the antenna of the UE for signals having a frequency of 28 GHz in different deployment scenarios as specified by the 3GPP TR 38.901 technical report are provided below in Table 2.

TABLE 2

|  | UMi | | UMa | | RMa | | InH | |
| --- | --- | --- | --- | --- | --- | --- | --- | --- |
|  | LOS | NLOS | LOS | NLOS | LOS | NLOS | LOS | NLOS |
| BS ZSD [deg] | 0.6 | 0.3 | 0.8 | 1.1 | 0.3 | 0.3 | 1.4 | 12 |
| UE ZSA [deg] | 3.8 | 7.3 | 8.9 | 11.1 | 1.7 | 1.3 | 11.5 | 14.7 |

As Tables 1 and 2 indicate, the angular spreads for signals that are transmitted and received at relatively high frequencies vary based on various factors. In this regard, the azimuth angular spread is significantly larger than the elevational angular spread. Further, the angular spreads of the radio channel are larger for the UE antenna than for the base station antenna.

With reference to FIGS. 1 and 2, examples of the effective antenna gain for the antenna of abase station and the antenna of a UE, respectively, are provided in conjunction with a UMi street canyon channel model as defined by the 3GPP TR 38.901 technical report. In this regard, the 3GPP TR 38.901 technical report defines communication at a frequency of 28 GHz utilizing LOS with analog beamforming and an antenna element gain of 5 dBi. For the base station antenna represented in FIG. 1, the 3GPP TR 38.901 technical report defines an ASD of 14° and a ZSD of 0.6°, while for the UE antenna of FIG. 2, the 3GPP TR 38.901 technical report defines an ASD of 41° and a ZSD of 3.8°. FIGS. 1 and 2 depict the effective antenna gain for different antenna array sizes, e.g., 2×2, 4×4, 8×8, 16×16 and 32×32. In this regard, an antenna array size of X×Y represents an antenna array having X antenna elements arranged in a first direction, e.g., along an x-axis, and Y antenna elements arranged in a second direction, typically orthogonal to the first direction, e.g., along a y-axis.

With reference to FIGS. 1 and 2, a comparison of the ideal antenna gain and the effective antenna gain is illustrated. For example, with an ASD of 14°, there is approximately 7 dB antenna gain degradation for abase station antenna array having a size of 16×16 and an antenna gain degradation of 14 dB for abase station antenna having a size of 32×32. Similarly, with respect to the UE antenna, the antenna gain degradation is even larger with antenna gain degradation of approximately 4 dB for a relatively small antenna array of size 2×2, and approximately 6 dB for an antenna array of size of 4×4. For larger UE antenna arrays, beamforming gain saturation is visible from FIG. 2 with the effective antenna gain levelling off as the UE antenna arrays become larger, thereby resulting in a UE antenna having a size of 16×16 having a significant antenna gain degradation of 14 dB.

A relatively large angular spread is also observed in conjunction with the propagation of signals between an outdoor environment and an indoor environment with the angular spread being even larger in this scenario than in an instance in which the signals propagate only in an outdoor environment. Thus, in conjunction with millimeter waves signals that propagate between a base station located in an outdoor environment and a UE located in an indoor environment, relatively high effective antenna gain degradation will be experienced in addition to relatively high penetration loss, thereby reducing the effective coverage expected by communication systems utilizing millimeter wave frequencies.

BRIEF SUMMARY

A method, apparatus and computer program product are provided in accordance with an example embodiment in order to select a plurality of antenna elements of an antenna array. In an example embodiment, the antenna elements are selected so as to match the angular spread of the antenna array to the deployment scenario. By matching the angular spread to the deployment scenario, the effective beamforming gain will be increased, thereby facilitating the effective use of the antenna array at higher frequencies, such as with millimeter wave frequencies, while continuing to provide for a relatively high user rate and without appreciable shrinking of the traditional cell coverage range.

In an example embodiment, a method is provided for selecting a plurality of antenna elements of an active antenna array that includes selecting a first plurality of antenna elements and obtaining a measure of a first signal based upon transmission or reception of a signal by the first plurality of antenna elements. The method also includes selecting a second plurality of antenna elements and obtaining a measure of a second signal based upon transmission or reception of a signal by the second plurality of antenna elements. The method further includes selecting a third plurality of antenna elements and obtaining a measure of a third signal based upon transmission or reception of a signal by the third plurality of antenna elements. The first, second and third plurality of antenna elements are each different selections of the plurality of antenna elements of the active antenna array. The method additionally includes processing the measures of the first, second and third signals and determining a sub-array of antenna elements of the active antenna array to be utilized based on the processing of the measures of the first, second and third signals.

The processing of the measures of the first, second and third signals may include estimating an angular spread of the signals. In an example embodiment, the angular spread is estimated by determining beamforming gains based upon the measures of the first, second and third signals and estimating at least one of an azimuth angular spread or an elevational angular spread of the signals based at least in part upon the beamforming gains. In an example embodiment, the beamforming gains are determined by determining a first signal strength value based on a difference in received signal strength between the second signal and the first signal and also based on a difference in transmitted signal strength between the second signal and the first signal and then converting the first signal strength value to a first relative beamforming gain. The beamforming gains are determined in accordance with this example embodiment by also determining a second signal strength value based on a difference in received signal strength between the third signal and the first signal and also based on a difference in transmitted signal strength between the third signal and the first signal and then converting the second signal strength value to a second relative beamforming gain. In an example embodiment, the first, second and third pluralities of antenna elements are selected by selecting three different sub-array configurations from an array of antenna elements.

In another example embodiment, an apparatus is provided that is configured to select a plurality of antenna elements of an active antenna array. The apparatus includes at least one processor and at least one memory including computer program code for one or more programs with the at least one memory and the computer program code configured to, with the at least one processor, cause the apparatus at least to receive a measure of a first signal based upon transmission or reception of a signal by a first plurality of antenna elements, to receive a measure of a second signal based upon transmission or reception of a signal by a second plurality of antenna elements and to receive a measure of a third signal based upon transmission or reception of a signal by a third plurality of antenna elements. The first, second and third pluralities of antenna elements are each different selections of the plurality of antenna elements of the active antenna array. The at least one memory and the computer program code are configured to, with the at least one processor, also cause the apparatus to process the measures of the first, second and third signals and to determine a sub-array of antenna elements of the active antenna array to be utilized based on the processing of the measures of the first, second and third signals.

The at least one memory and the computer program code are configured to, with the at least one processor, cause the apparatus of an example embodiment to process the measures of the first, second and third signals by estimating an angular spread of the signal. The at least one memory and the computer program code are configured to, with the at least one processor, cause the apparatus of this example embodiment to estimate the angular spread by determining beamforming gains based upon the measures of the first, second and third signals and by estimating at least one of an azimuth angular spread or an elevational angular spread of the signal based at least in part upon the beamforming gains. The at least one memory and the computer program code are configured to, with the at least one processor, cause the apparatus of an example embodiment to determine beamforming gains by determining the first signal value strength based on a difference in received signal strength between the second signal and the first signal and also based on a difference in transmitted signal strength between the second signal and the first signal and by converting the first signal strength value to a first relative beamforming gain. The at least one memory and the computer program code are also configured to, with the at least one processor, cause the apparatus of this example embodiment to determine beamforming gains by determining a second signal strength value based on a difference in received signal strength between the third signal and the first signal and also based on a difference in transmitted signal strength between the third signal and the first signal and by converting the second signal strength value to a second relative beamforming gain.

In a further example embodiment, a computer program product is provided that is configured to select a plurality of antenna elements of an active antenna array. The computer program product includes at least one non-transitory computer-readable storage medium having computer executable program code instructions stored therein with the computer executable program code instructions including program code instructions configured, upon execution, to receive a measure of a first signal based upon transmission or reception of a signal by a first plurality of antenna elements, to receive a measure of a second signal based upon transmission or reception of a signal by a second plurality of antenna elements and to receive a measure of a third signal based upon transmission or reception of a signal by a third plurality of antenna elements. The first, second and third pluralities of antenna elements are each different selections of the plurality of antenna elements of the active antenna array. The computer executable program code instructions also include program code instructions configured, upon execution, to process the measures of the first, second and third signals and to determine a sub-array of antenna elements of the active antenna array to be utilized based on the processing of the measures of the first, second and third signals.

The program code instructions configured to process the measures of the first, second and third signals in accordance with an example embodiment include program code instructions configured to estimate an angular spread of the signal. In this example embodiment, the program code instructions configured to estimate the angular spread include program code instructions configured to determine beamforming gains based upon the measures of the first, second and third signals and program code instructions configured to estimate at least one of an azimuth angular spread or an elevational angular spread of the signal based at least in part upon the beamforming gains. In an example embodiment, the program code instructions configured to determine beamforming gains include program code instructions configured to determine a first signal strength value based on a difference in received signal strength between the second signal and the first signal and also based on a difference in transmitted signal strength between the second signal and the first signal and program code instructions configured to convert the first signal strength value to a first relative beamforming gain. In this example embodiment, the program code instructions configured to determine the beamforming gains also include program code instructions configured to determine a second signal strength value based on a difference in received signal strength between the third signal and the first signal and also based on a difference in transmitted signal strength between the third signal and the first signal and program code instructions configured to convert the second signal strength value to a second relative beamforming gain.

In yet another example embodiment, an apparatus is provided that is configured to select a plurality of antenna elements of an active antenna array that includes means for receiving a measure of a first signal based upon transmission or reception of a signal by a first plurality of antenna elements, means for receiving a measure of a second signal based upon transmission or reception of a signal by a second plurality of antenna elements and means for receiving a measure of a third signal based upon transmission or reception of a signal by a third plurality of antenna elements. The first, second and third plurality of antenna elements are each different selections of the plurality of antenna elements of the active antenna array. The apparatus of this example embodiment also includes means for processing the measures of the first, second and third signals and means for determining a sub-array of antenna elements of the active antenna array to be utilized based on the processing of the measures of the first, second and third signals.

In an example embodiment, the means for processing the measures of the first, second and third signals include means for estimating an angular spread of the signal. In this example embodiment, the means for estimating the angular spread include means for determining beamforming gains based upon the measures of the first, second and third signals and means for estimating at least one of an azimuth angular spread or an elevational angular spread of the signal based at least in part upon the beamforming gains. In an example embodiment, the means for determining the beamforming gain include means for determining a first signal strength value based on a difference in received signal strength between the second signal and the first signal and also based on a difference in transmitted signal strength between the second signal and the first signal and means for converting the first signal strength value to a first relative beamforming gain. In this example embodiment, the means for determining beamforming gains also include means for determining a second signal strength value based on a difference in received signal strength between the third signal and the first signal and also based on a difference in transmitted signal strength between the third signal and the first signal and means for converting the second signal strength value to a second relative beamforming gain.

In another example embodiment, an antenna system is provided that includes an antenna array including a plurality of antenna elements, processing circuitry and a receiver or transmitter connected to a sub-array of antenna elements and configured to receive or transmit signals, respectively. The processing circuitry is configured to receive a measure of a first signal based upon transmission or reception of a signal by a first plurality of antenna elements, receive a measure of a second signal based upon transmission or reception of a signal by a second plurality of antenna elements and receive a measure of a third signal based upon transmission or reception of a signal by a third plurality of antenna elements. The first, second and third plurality of antenna elements are each different selections of the plurality of antenna elements of the antenna array. The processing circuitry is also configured to process the measures of the first, second and third signals and to determine the sub-array of antenna elements of the antenna array to be utilized based on the processing of the measures of the first, second and third signals.

The processing circuitry of an example embodiment is configured to process the measures of the first, second and third signals by estimating an angular spread of the signal. In an example embodiment, the processing circuitry is configured to estimate the angular spread by determining beamforming gains based upon the measures of the first, second and third signals and by estimating at least one of an azimuth angular spread or an elevational angular spread of the signal based at least in part upon the beamforming gains. The processing circuitry of an example embodiment is configured to determine beamforming gains by determining a first signal strength value based on a difference in received signal strength between the second signal and the first signal and also based on a difference in transmitted signal strength between the second signal and the first signal and by converting the first signal strength value to a first relative beamforming gain. The processing circuitry of this example embodiment is also configured to determine beamforming gains by determining a second signal strength value based on a difference in received signal strength between the third signal and the first signal and also based on a difference in transmitted signal strength between the third signal and the first signal and by converting the second signal strength value to a second relative beamforming gain.

In an example embodiment, a method is provided for determining an arrangement of antenna elements of an antenna array. The method includes determining a first dimension of the arrangement in terms of a number of antenna elements based on a total number of the antenna elements of the antenna array, a number of radio frequency chains, a nominal bandwidth of the antenna elements and an angular spread. The method also includes determining a second dimension of the arrangement in terms of a number of antenna elements based on the first dimension, the total number of antenna elements of the antenna array and a number of radio frequency chains. The method further includes determining an effective gain of the arrangement of the antenna elements having the first and second dimensions and determining the arrangement of the antenna elements of the antenna array based on the effective gain.

The method of an example embodiment also includes determining another second dimension of the arrangement in terms of a number of antenna elements based on the total number of antenna elements of the antenna array, the number of radio frequency chains, the nominal bandwidth of the antenna elements and the angular spread. The method of this example embodiment also includes determining another first dimension of the arrangement in terms of a number of antenna elements based on the another second dimension, the total number of the antenna elements of the antenna array and the number of radio frequency chains. The method of this example embodiment further includes determining another effective gain of the arrangement of the antenna elements having another first and second dimensions with the determination of the arrangement of the antenna elements of the antenna array being based, in this example embodiment, on the effective gain and the another effective gain. In an example embodiment, the first dimension and the another first dimension represent a number of rows of the arrangement, and the second dimension and the another second dimension represent a number of columns of the arrangement. In an example embodiment, the method determines the arrangement of the antenna elements of the antenna array based on the effective gain and the another effective gain by identifying the arrangement for which the effective gain or the another effective gain is largest.

In another example embodiment, an apparatus is provided that is configured to determine an arrangement of antenna elements of an antenna array. The apparatus includes at least one processor and at least one memory including computer program code for one or more programs with the at least one memory and the computer program code configured to, with the at least one processor, cause the apparatus at least to determine a first dimension of the arrangement in terms of a number of antenna elements based on a total number of antenna elements of the antenna array, a number of radio frequency chains, a nominal bandwidth of the antenna elements and an angular spread. The at least one memory and the computer program code are also configured to, with the at least one processor, cause the apparatus to determine a second dimension of the arrangement in terms of a number of antenna elements based on the first dimension, the total number of the antenna elements of the antenna array and the number of radio frequency chains. The at least one memory and the computer program code are further configured to, with the at least one processor, cause the apparatus to determine an effective gain of the arrangement of the antenna elements having the first and second dimensions and to determine the arrangement of the antenna elements of the antenna array based on the effective gain.

The at least one memory and the computer program code are further configured to, with the at least one processor, cause the apparatus of an example embodiment to determine another second dimension of the arrangement in terms of a number of antenna elements based on the total number of the antenna elements of the antenna array, the number of radio frequency chains, the nominal bandwidth of the antenna elements and the angular spread. The at least one memory and the computer program code are also configured to, with the at least one processor, cause the apparatus of this example embodiment to determine another first dimension of the arrangement in terms of a number of antenna elements based on the another second dimension, the total number of the antenna elements of the antenna array and the number of radio frequency chains. The at least one memory and the computer program code are further configured to, with the at least one processor, cause the apparatus of this example embodiment to determine another effective gain of the arrangement of the antenna elements having the another first and second dimensions. Further, the at least one memory and the computer program code are configured to, with the at least one processor, cause the apparatus of this example embodiment to determine the arrangement of the antenna elements of the antenna array by determining the arrangement of the antenna elements of the antenna array based on the effective gain and the another effective gain. In an example embodiment, the first dimension and the another first dimension represent a number of rows of the arrangement, while the second dimension and the another second dimension represent a number of columns of the arrangement. The at least one memory and the computer program code are configured to, with the at least one processor, cause the apparatus of an example embodiment to determine the arrangement of the antenna elements of the antenna array based on the effective gain and the another effective gain by identifying the arrangement for which the effective gain or the another effective gain is largest.

In a further example embodiment, a computer program product is provided that is configured to determine an arrangement of antenna elements of an antenna array. The computer program product includes at least one non-transitory computer-readable storage medium having computer executable program code instructions stored therein with the computer executable program code instructions including program code instructions configured, upon execution, to determine a first dimension of the arrangement in terms of a number of antenna elements based on a total number of the antenna elements of the antenna array, a number of radio frequency chains, a nominal bandwidth of the antenna elements and an angular spread. The computer executable program code instructions also include program code instructions configured, upon execution, to determine a second dimension of the arrangement in terms of a number of antenna elements based on the first dimension, the total number of the antenna elements of the antenna array and the number of radio frequency channels. The computer executable program code instructions further include program code instructions configured, upon execution, to determine an effective gain of the arrangement of the antenna elements having the first and second dimensions and to determine the arrangement of the antenna elements of the antenna array based on the effective gain.

The computer executable program code instructions of an example embodiment also include program code instructions configured, upon execution, to determine another second dimension of the arrangement in terms of a number of antenna elements based on the total number of the antenna elements of the antenna array, the number of radio frequency chains, the nominal beamwidth of the antenna elements and the angular spread. The computer executable program code instructions of this example embodiment also include program code instructions configured, upon execution, to determine another first dimension of the arrangement in terms of a number of antenna elements based on the another second dimension, the total number of the antenna elements of the antenna array and the number of radio frequency chains. The computer executable program code instructions of this example embodiment further include program code instructions configured, upon execution, to determine another effective gain of the arrangement of the antenna elements having the another first and second dimensions. In this example embodiment, the program code instructions configured to determine the arrangement of the antenna elements of the antenna array include program code instructions configured to determine the arrangement of the antenna elements of the antenna array based on the effective gain and the another effective gain. In an example embodiment, the first dimension and the another first dimension represent a number of rows of the arrangement, while the second dimension and the another second dimension represent a number of columns of the arrangement. In this example embodiment, the program code instructions configured to determine the arrangement of the antenna elements of the antenna array based on the effective gain and the another effective gain include program code instructions configured to identify the arrangement for which the effective gain or the another effective gain is largest.

In yet another example embodiment, an apparatus is provided that is configured to determine an arrangement of antenna elements of an antenna array. The apparatus includes means for determining a first dimension of the arrangement in terms of a number of antenna elements based on a total number of the antenna elements of the antenna array, a number of radio frequency chains, a nominal bandwidth of the antenna elements and an angular spread. The apparatus also includes means for determining a second dimension of the arrangement in terms of a number of antenna elements based on the first dimension, the total number of the antenna elements of the antenna array and the number of radio frequency chains. The apparatus further includes means for determining an effective gain of the arrangement of the antenna elements having the first and second dimensions and means for determining the arrangement of the antenna elements of the antenna array based on the effective gain.

The apparatus of an example embodiment also includes means for determining another second dimension of the arrangement in terms of a number of antenna elements based on the total number of the antenna elements of the antenna array, the number of radio frequency chains, the nominal bandwidth of the antenna elements and the angular spread. The apparatus of this example embodiment further includes means for determining another first dimension of the arrangement in terms of a number of antenna elements based on the another second dimension, the total number of the antenna elements of the antenna array and the number of radio frequency chains. The apparatus of this example embodiment further includes means for determining another effective gain of the arrangement of the antenna elements having the another first and second dimensions. In this example embodiment, the means for determining the arrangement of the antenna elements of the antenna array includes means for determining the arrangement of the antenna elements of the antenna array based on the effective gain and the another effective gain. In this example embodiment, the first dimension and the another first dimension may represent a number of rows of the arrangement, while the second dimension and the another second dimension represent a number of columns of the arrangement. In this example embodiment, the means for determining the arrangement of the antenna elements of the antenna array based on the effective gain and the another effective gain may include means for identifying the arrangement for which the effective gain or the another effective gain is largest.

In a further example embodiment, an antenna system is provided that includes an antenna array comprising a plurality of antenna elements, processing circuitry and a receiver or transmitter connected to the sub-array of antenna elements and configured to receive or transmit signals, respectively. The processing circuitry is configured to determine a first dimension of the arrangement in terms of a number of antenna elements based on a total number of antenna elements of the antenna array, a number of radio frequency chains, a nominal beamwidth of the antenna elements and an angular spread. The processing circuitry is also configured to determine a second dimension of the arrangement in terms of a number of antenna elements based on the first dimension, the total number of the antenna elements of the antenna array and the number of radio frequency chains. The processing circuitry is further configured to determine an effective gain of the arrangement of the antenna elements having the first and second dimensions and to determine the arrangement of the antenna elements of the antenna array based on the effective gain.

The processing circuitry of an example embodiment is also configured to determine another second dimension of the arrangement in terms of a number of antenna elements based on the total number of the antenna elements of the antenna array, the number of radio frequency chains, the nominal beamwidth of the antenna elements and an angular spread. The processing circuitry of this example embodiment is also configured to determine another first dimension of the arrangement in terms of a number of antenna elements based on the another second dimension, the total number of the antenna elements of the antenna array and the number of radio frequency chains. The processing circuitry of this example embodiment is further configured to determine another effective gain of the arrangement of the antenna elements having another first and second dimensions. In this example embodiment, the processing circuitry is configured to determine the arrangement of the antenna elements of the antenna array by determining the arrangement of the antenna elements of the antenna array based on the effective gain and the another effective gain. In this example embodiment, the first dimension and the another first dimension represent a number of rows of the arrangement, while the second dimension and the another second dimension represent a number of columns of the arrangement. In this example embodiment, the processing circuitry is configured to determine the arrangement of the antenna elements of the antenna array based on the effective gain and the another effective gain by identifying the arrangement for which the effective gain or the another effective gain is largest.

BRIEF DESCRIPTION OF THE DRAWINGS

Figure 1:
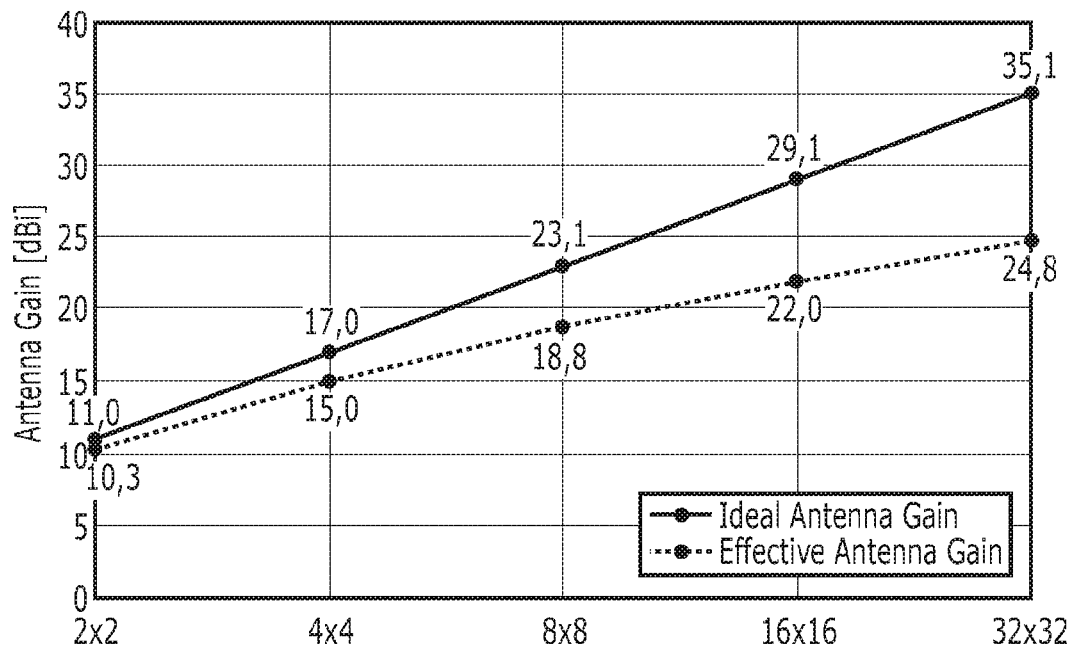
Figure 2:
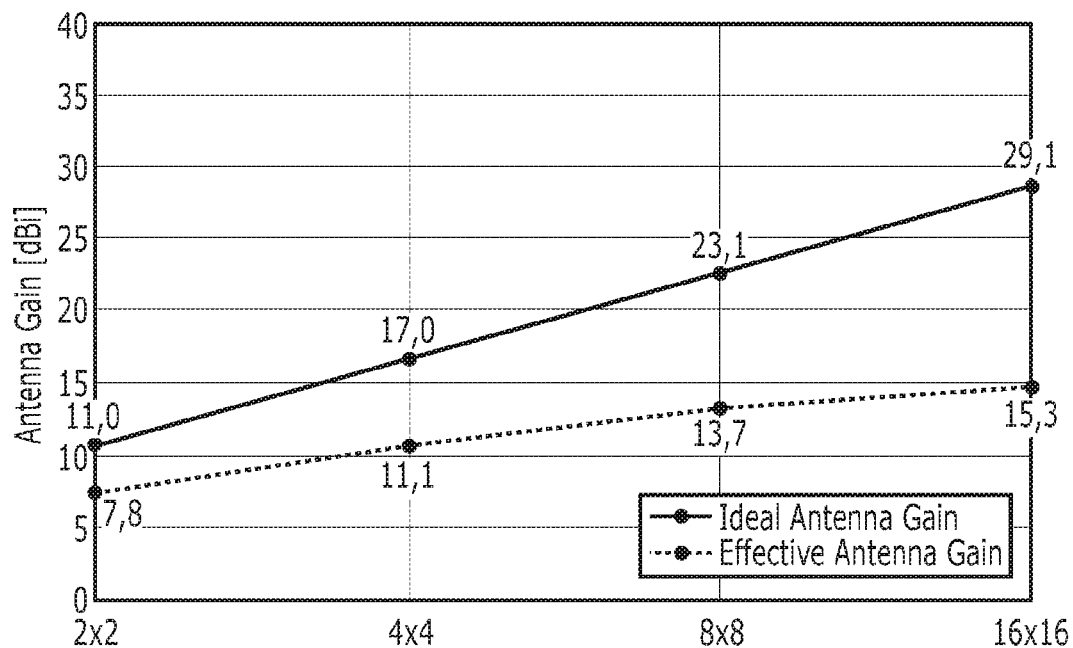
Figure 3:
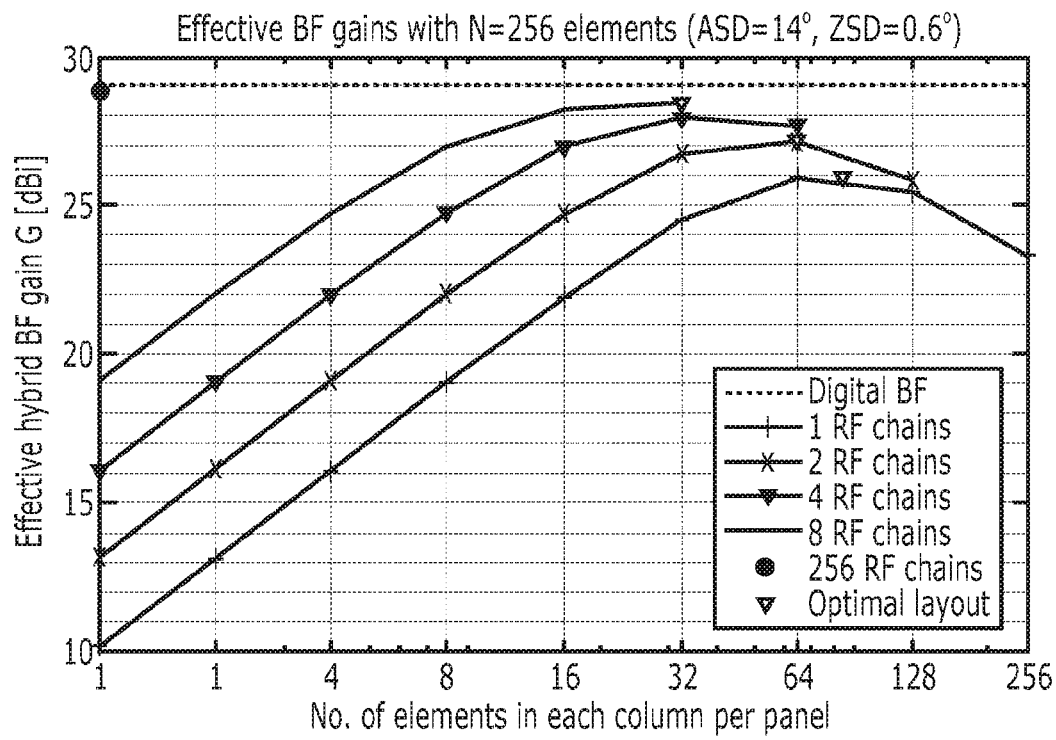
Figure 4:
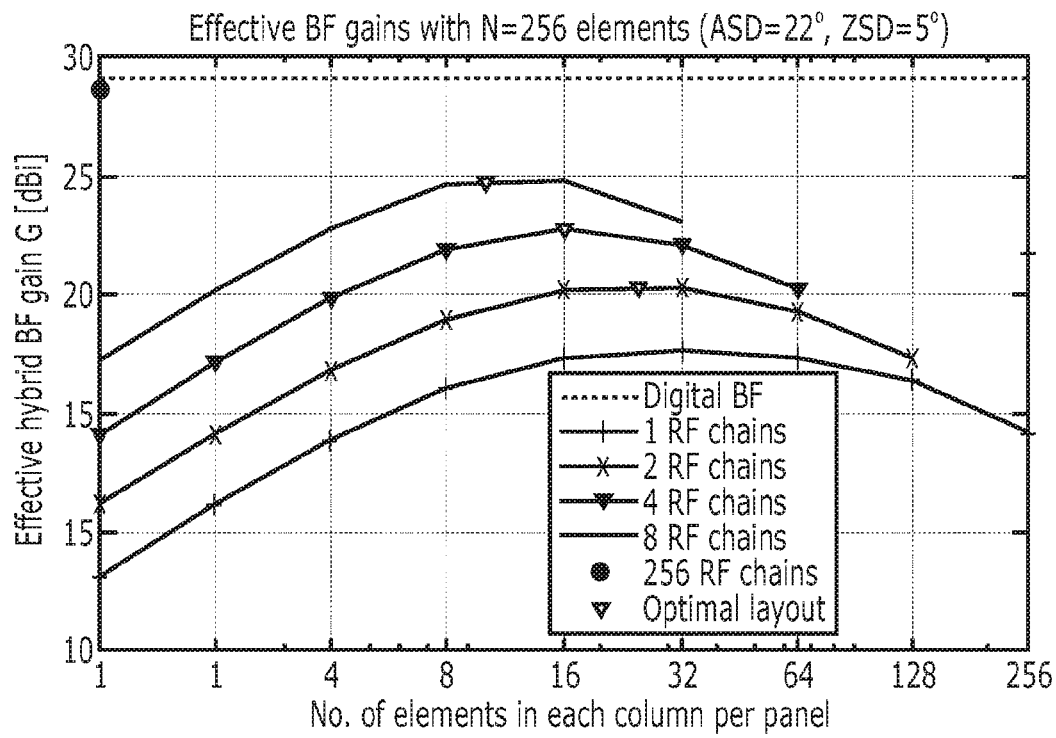
Figure 5A:
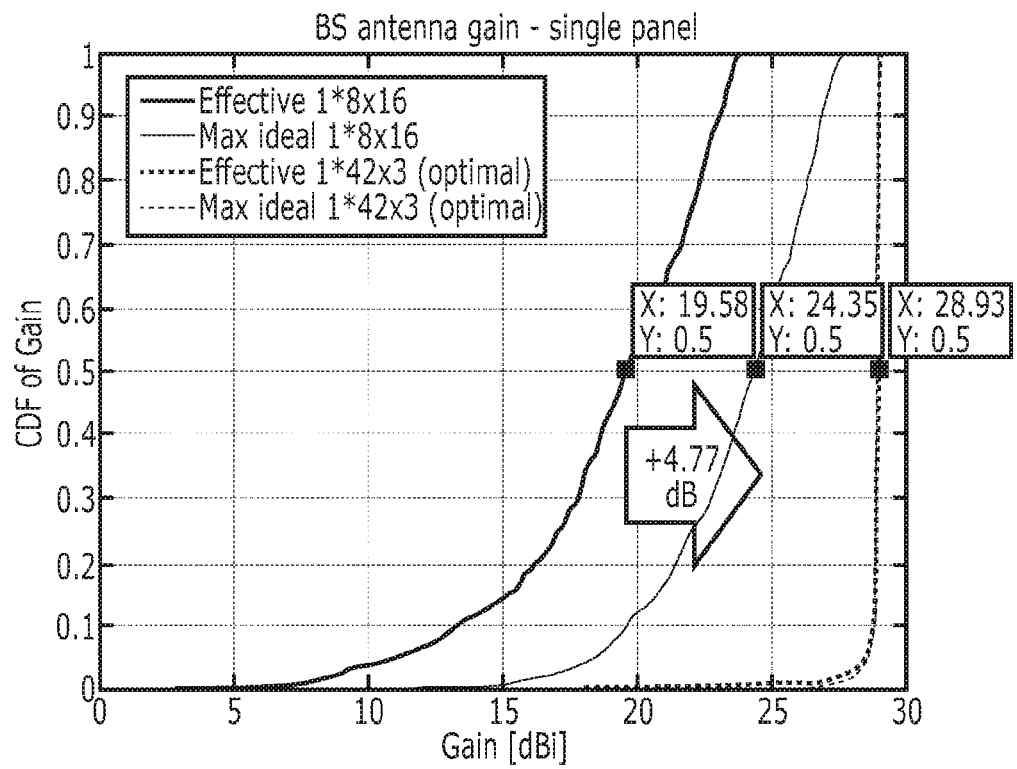
Figure 5B:
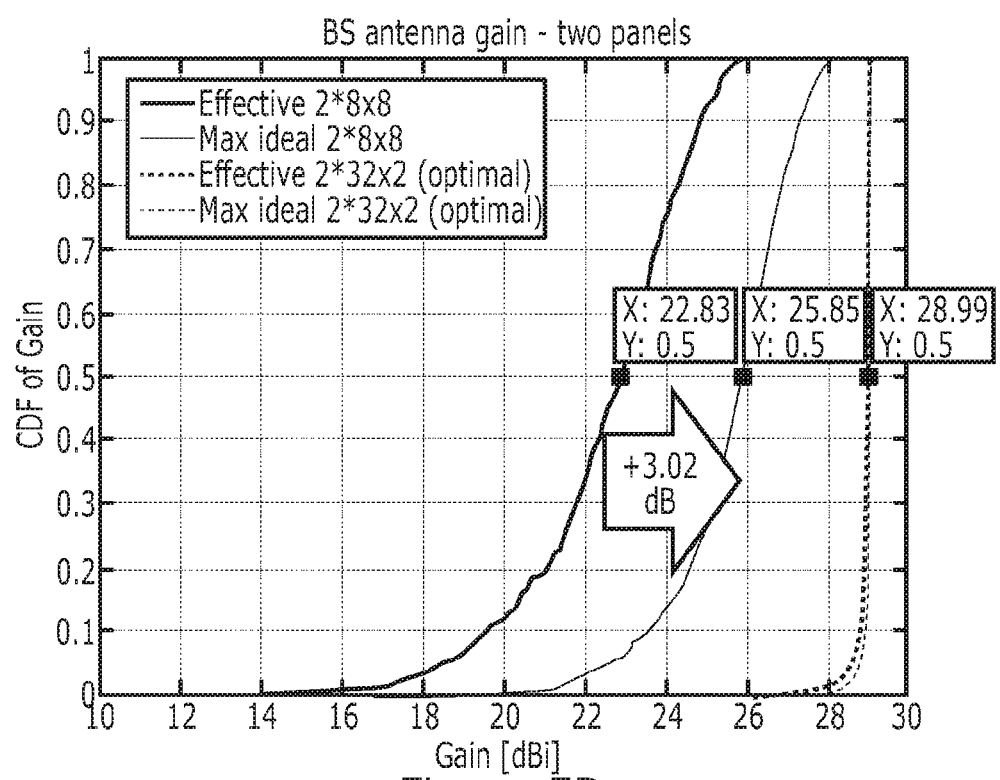
Figure 6A:
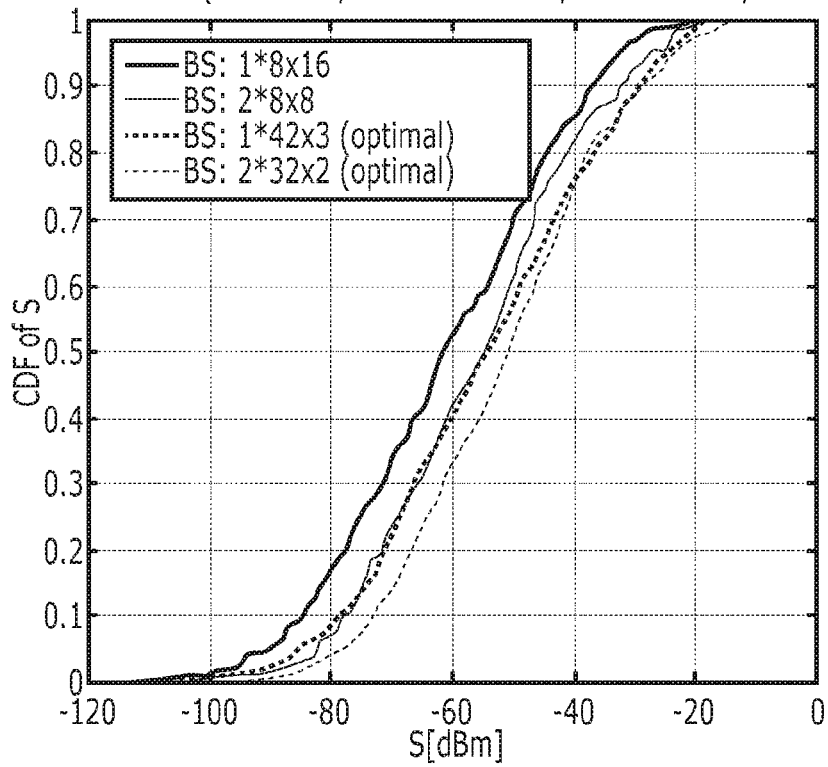
Figure 6B:
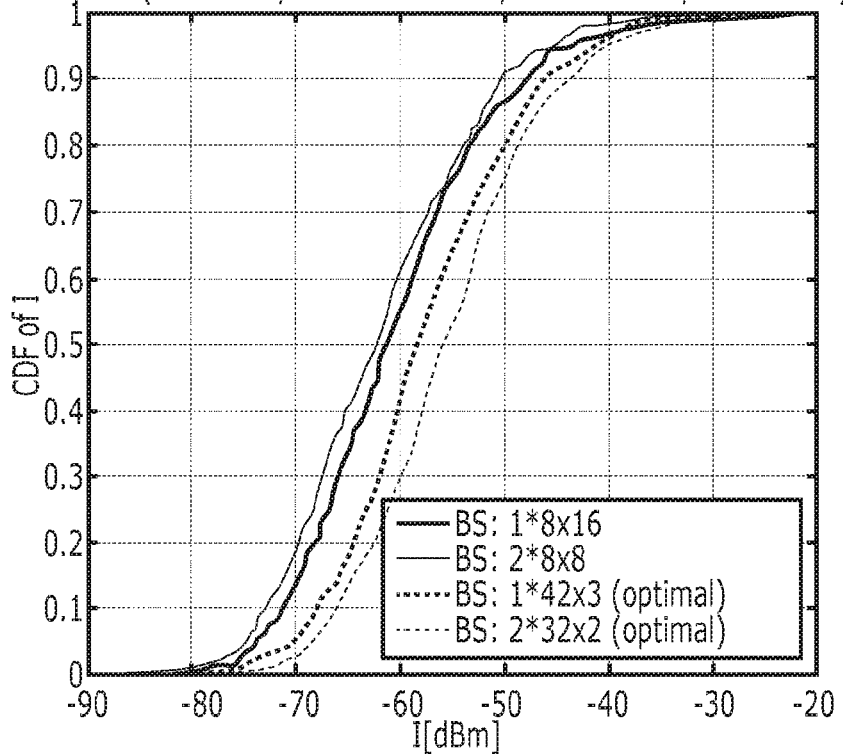
Figure 6C:
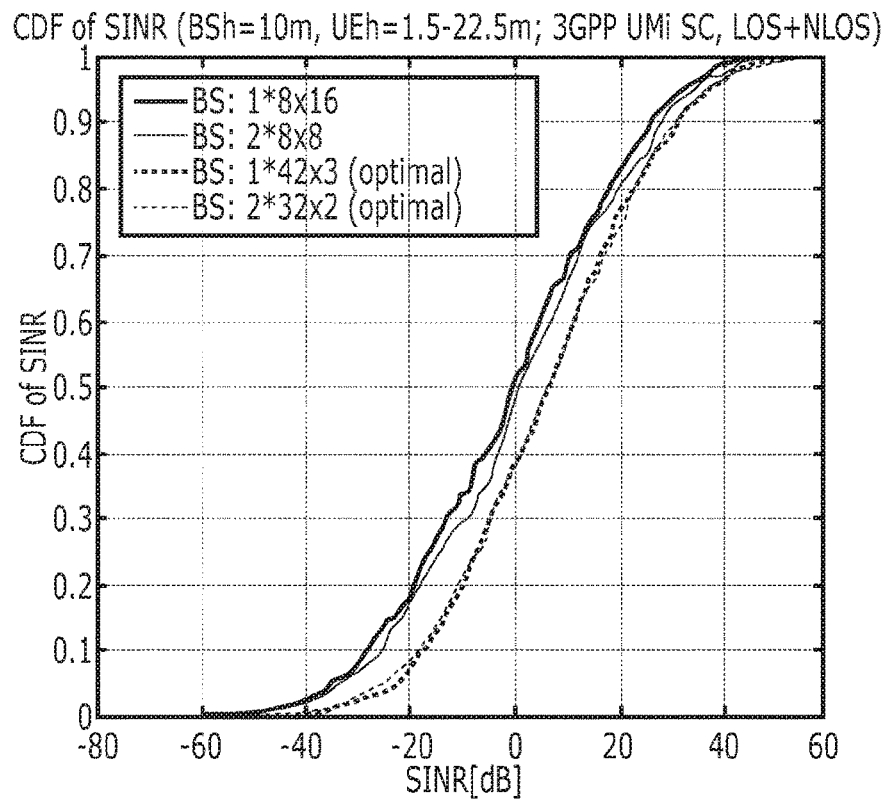
Figure 7A:
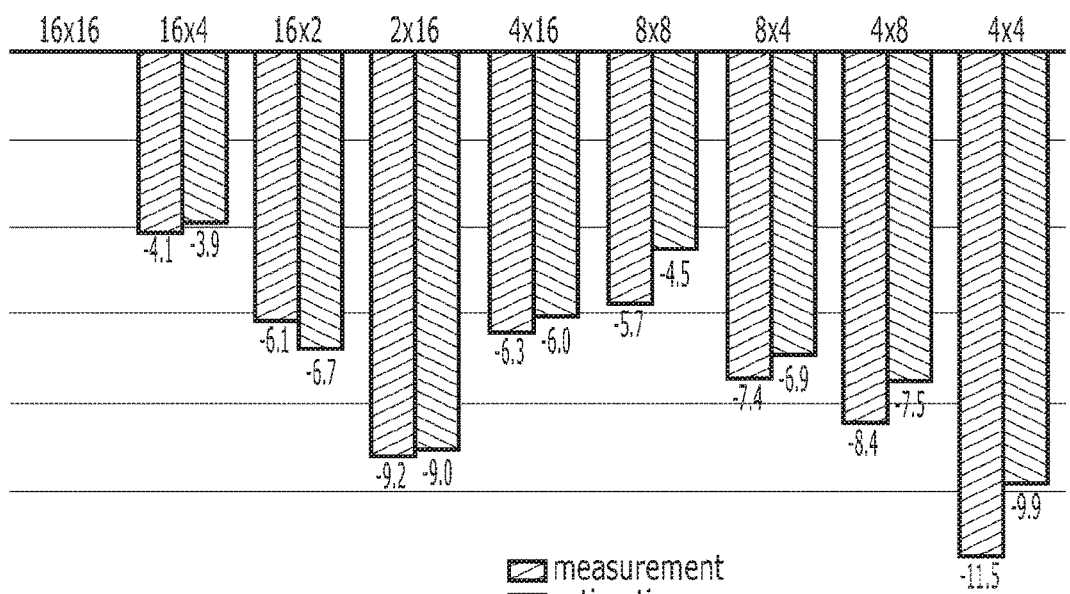
Figure 7B:
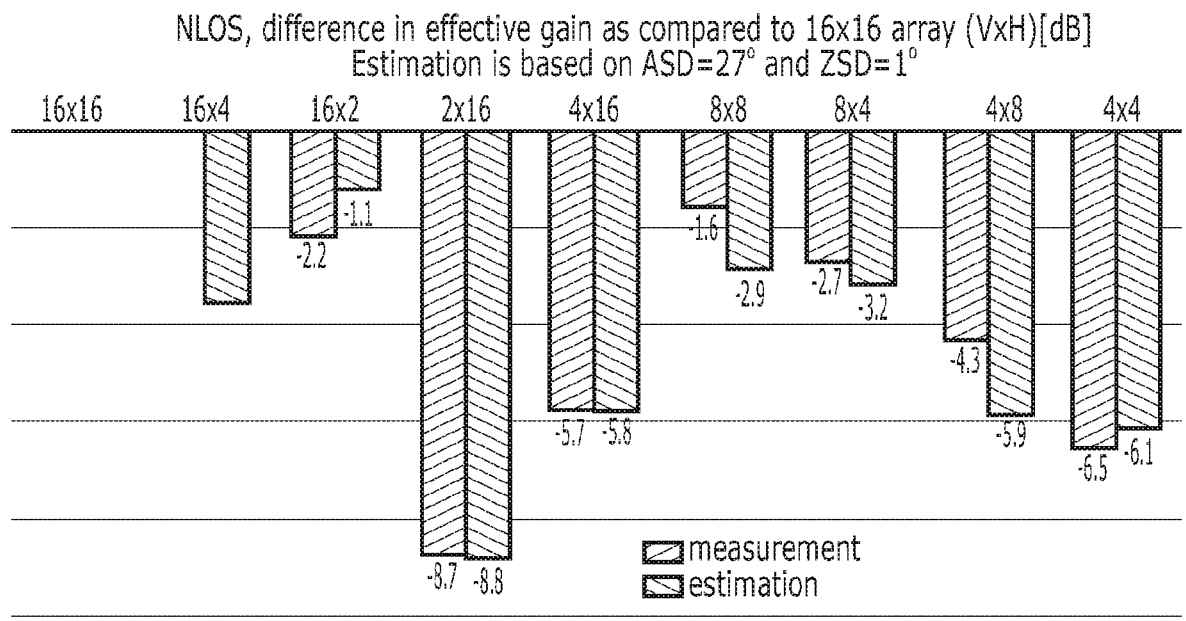
Figure 8:
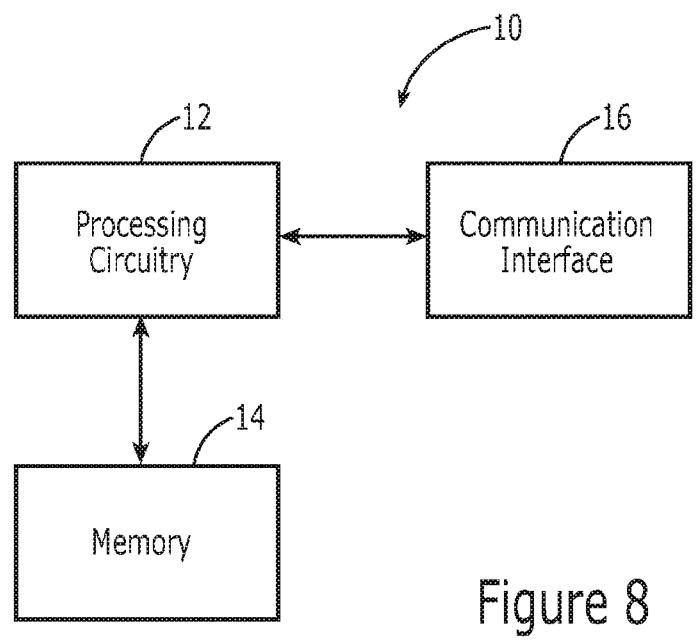
Figure 9:
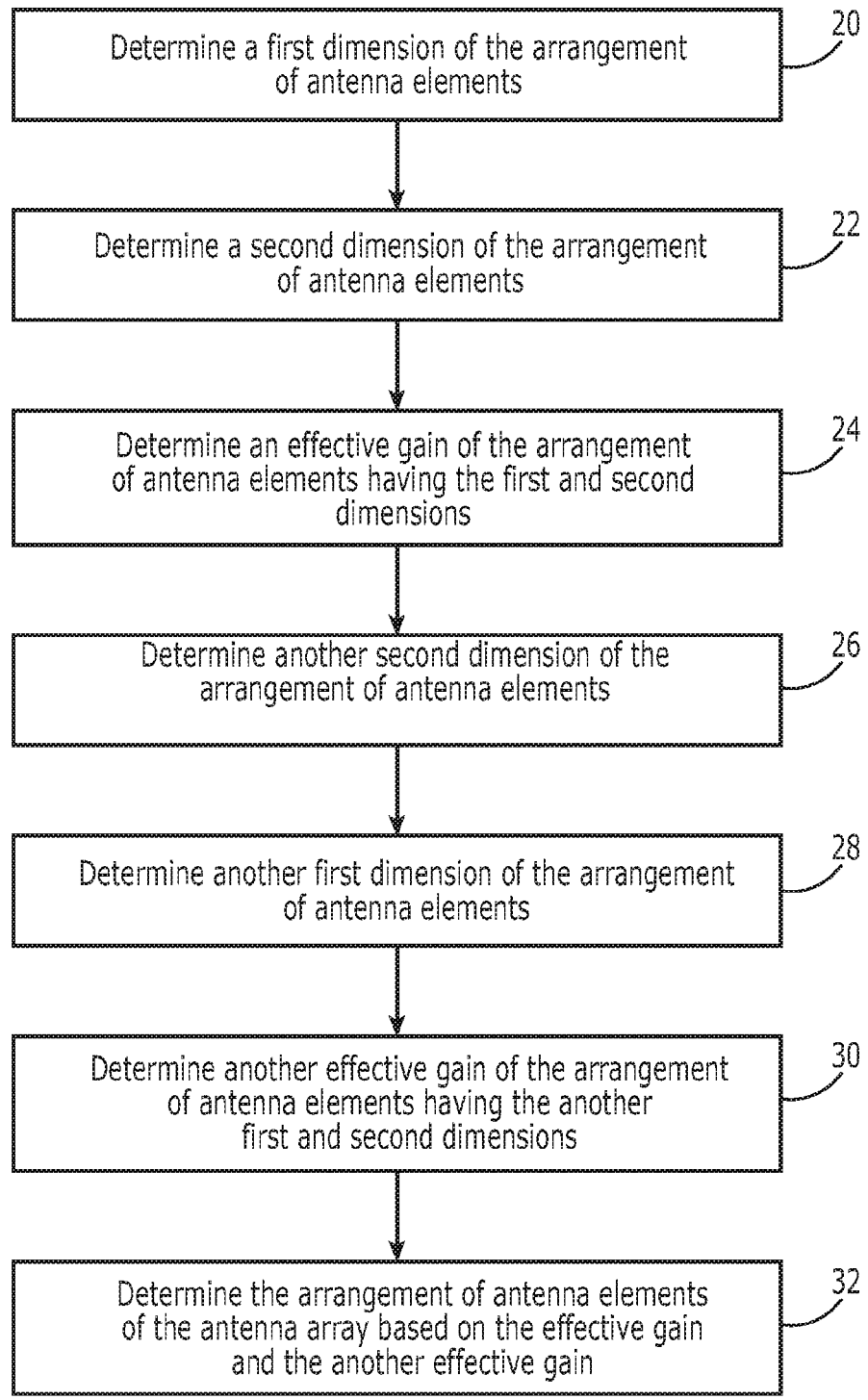
Figure 10A:
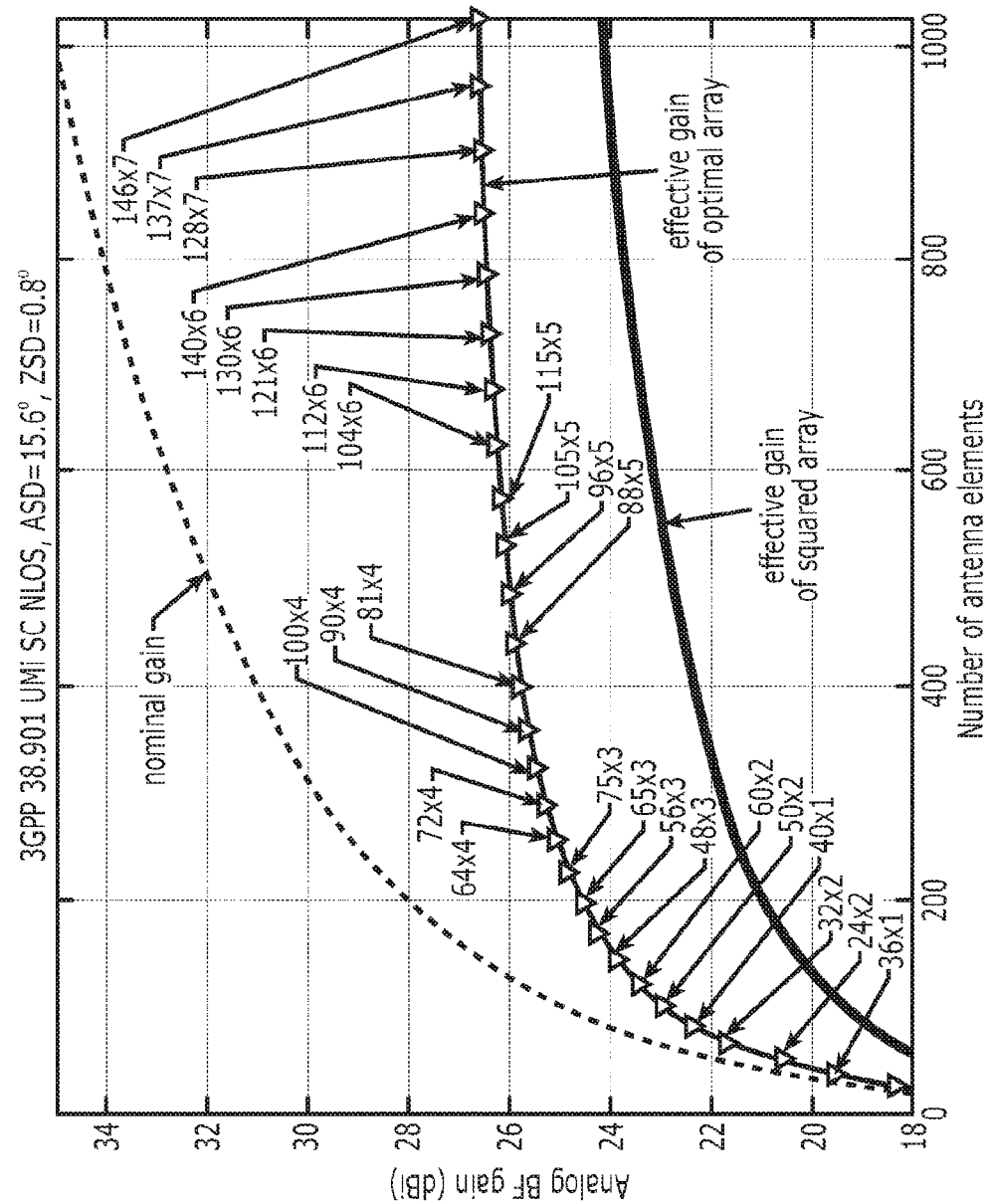
Figure 10B:
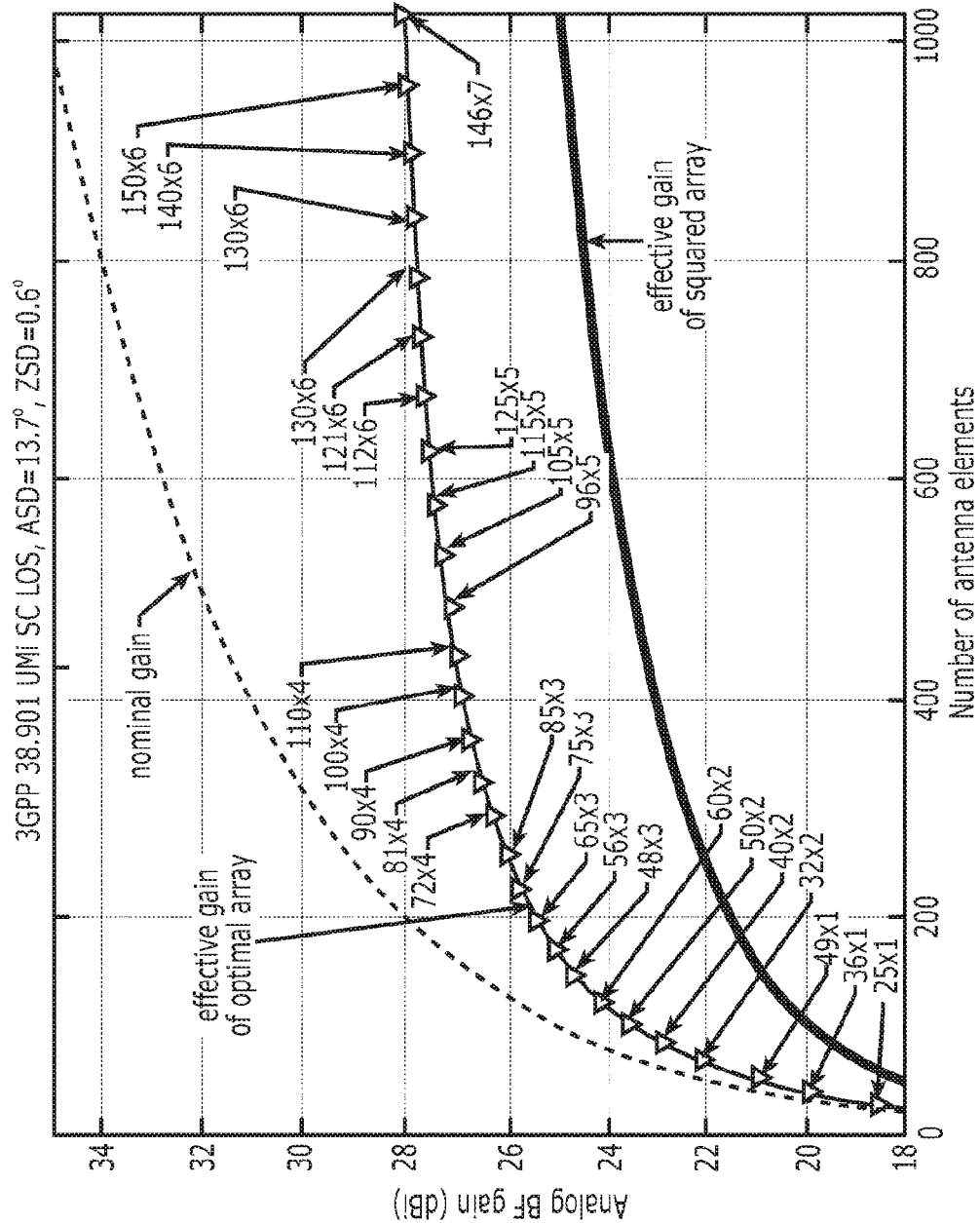
Figure 11:
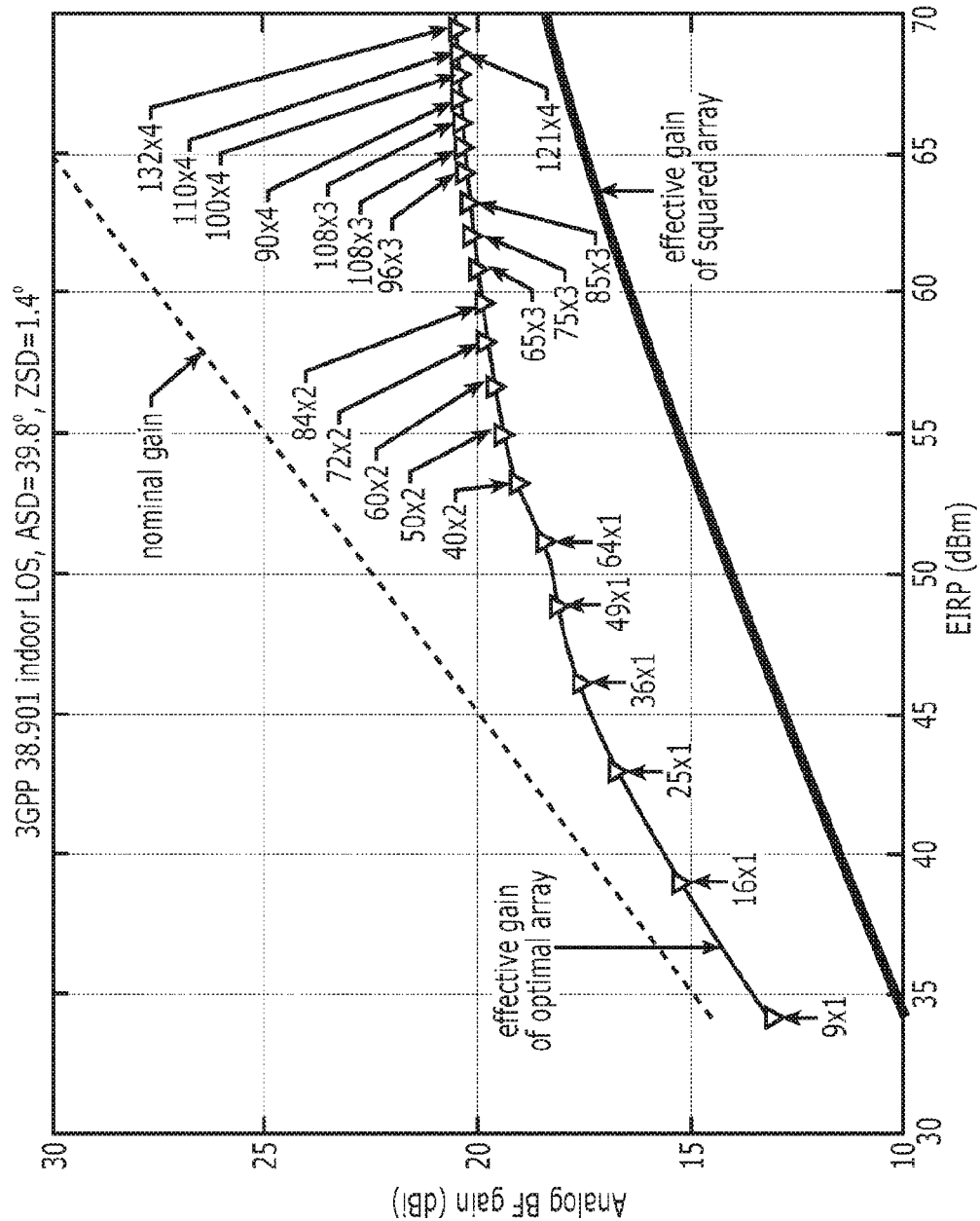
Figure 12:
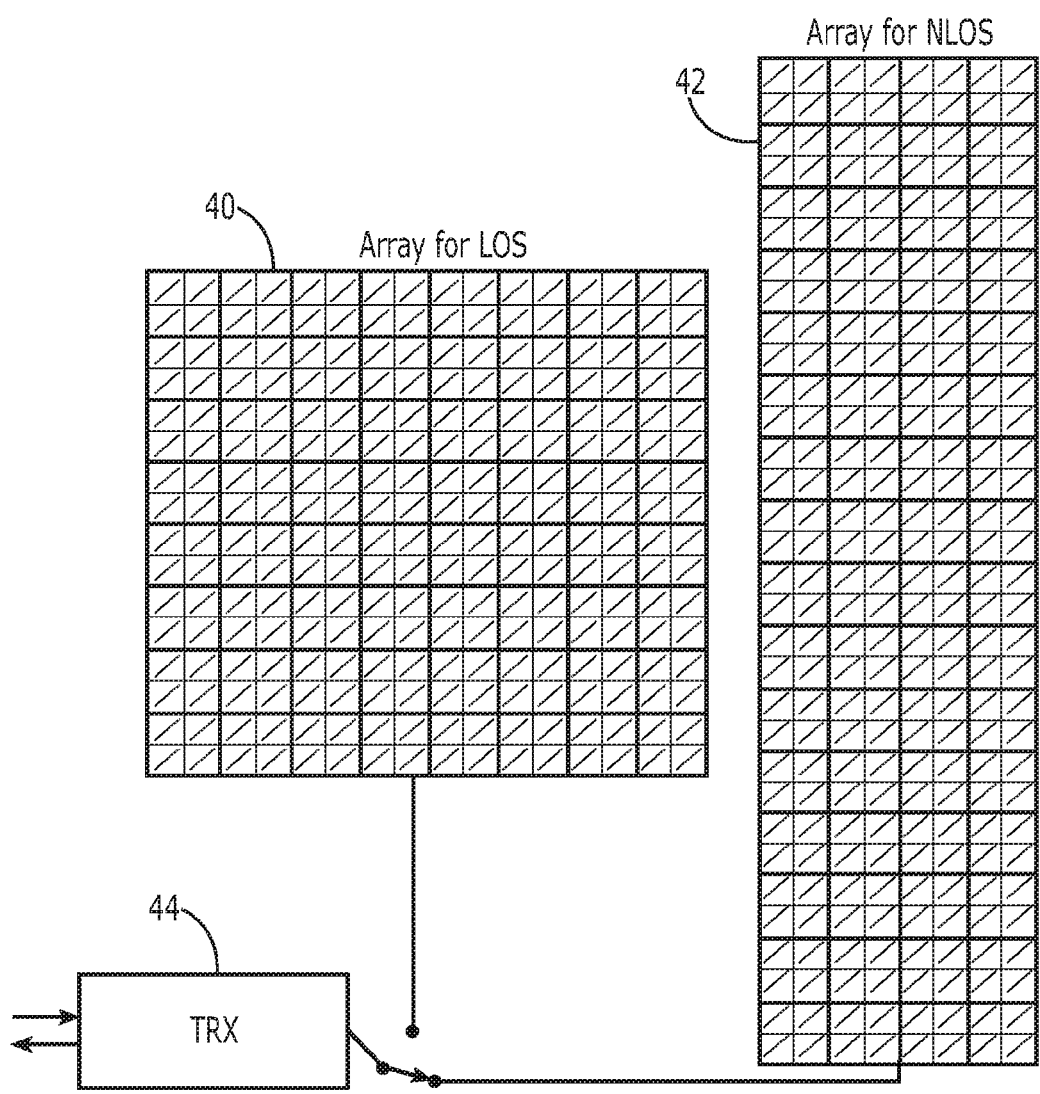
Figure 13:
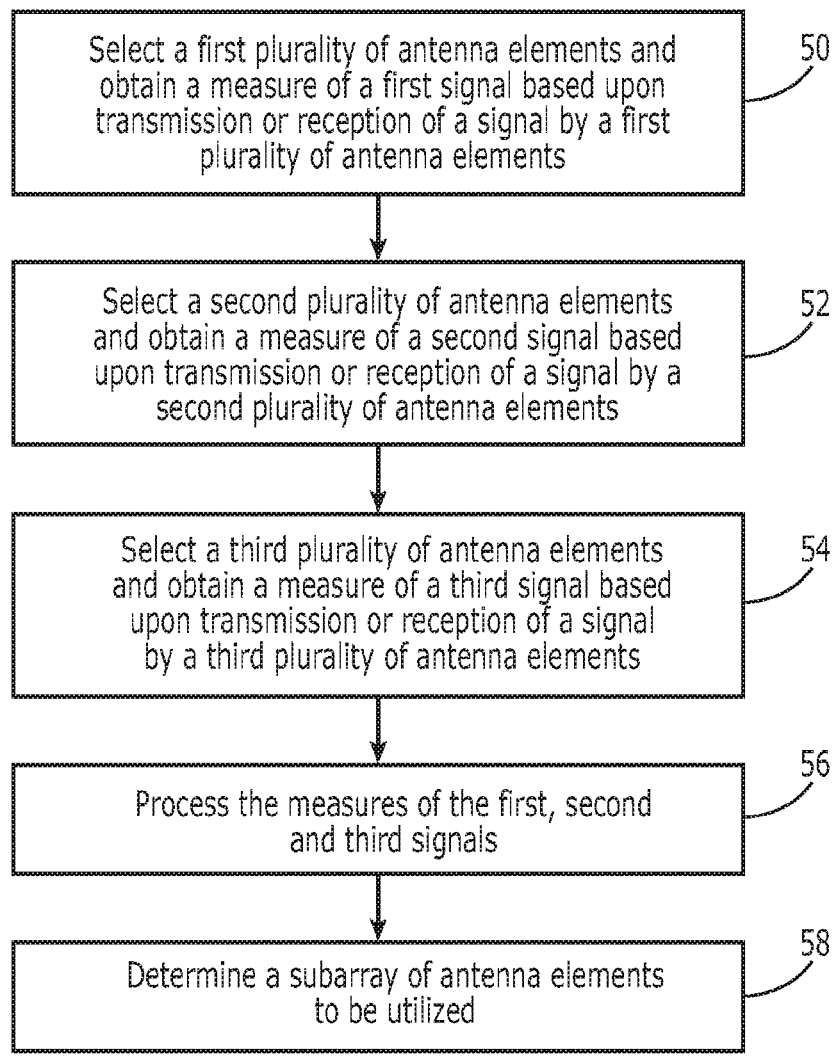
Figure 14A:
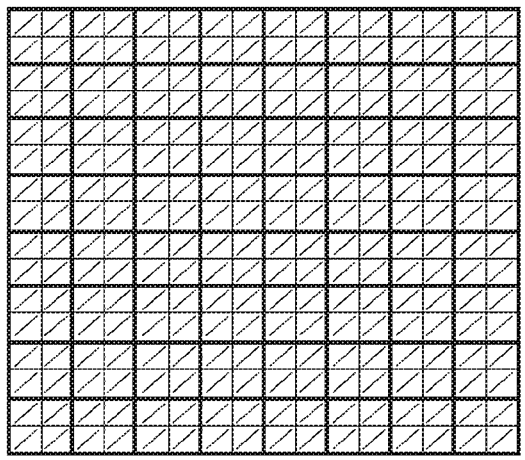
Figure 14B:
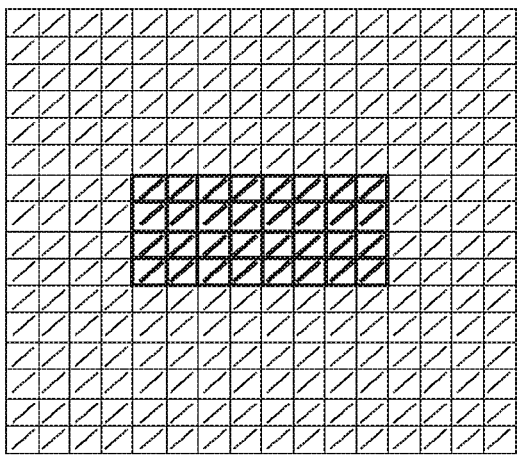
Figure 14C:
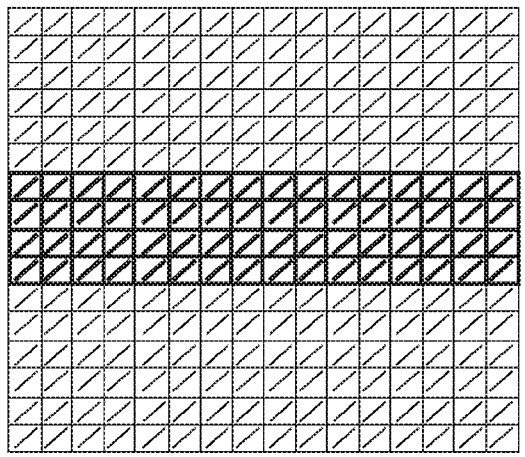
Figure 14D:
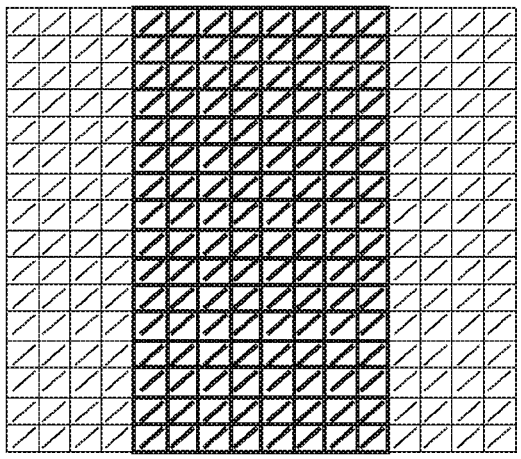
Figure 15:
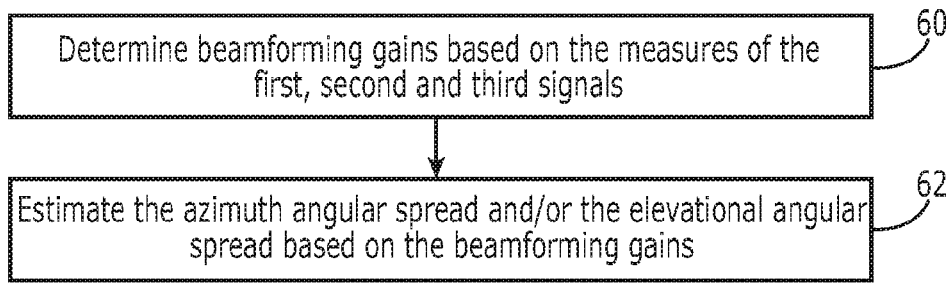
Figure 16:
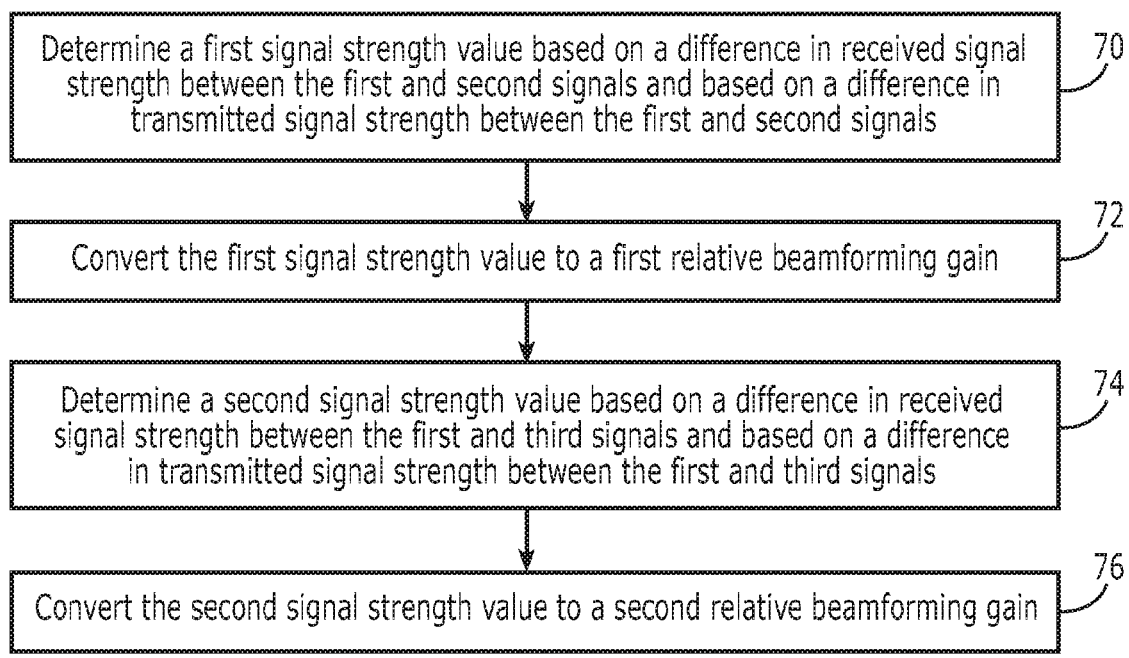
Figure 17:
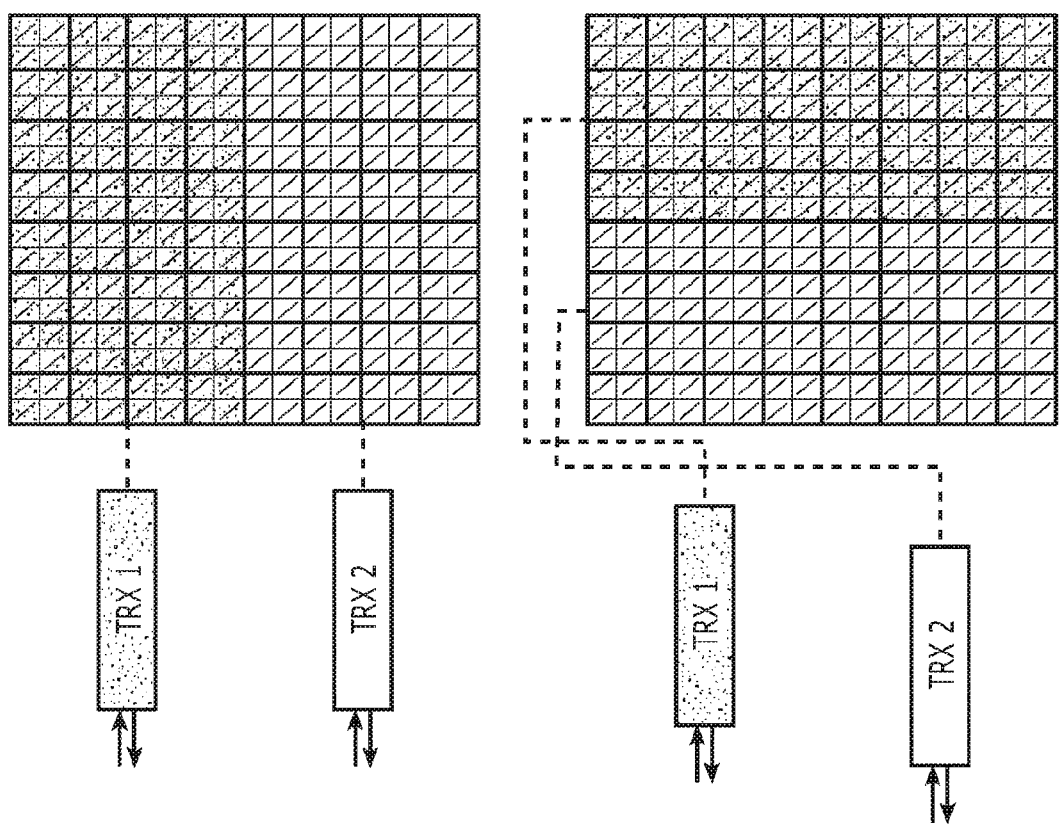
Figure 18:
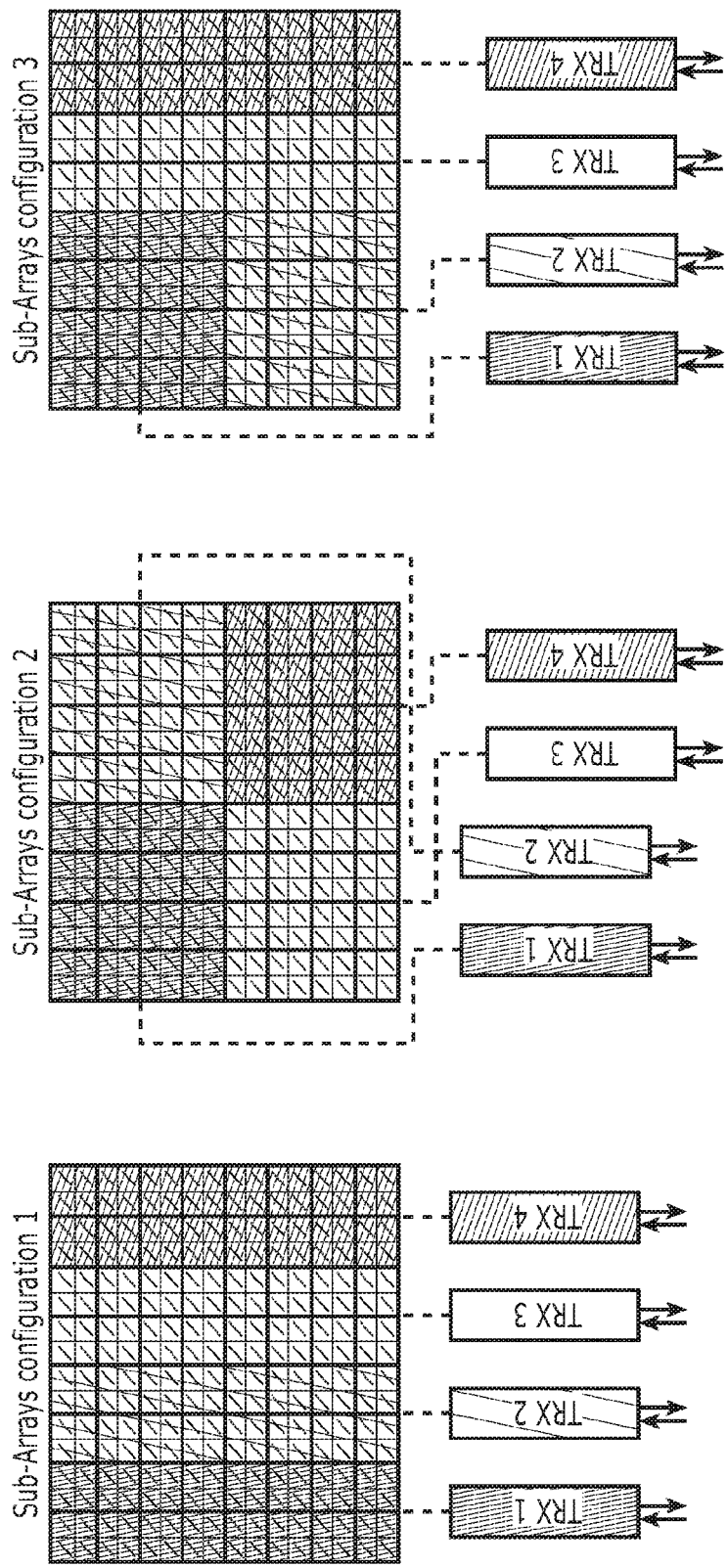

Having thus described certain example embodiments of the present disclosure in general terms, reference will hereinafter be made to the accompanying drawings, which are not necessarily drawn to scale, and wherein:

FIG. 1 is a graph representing the ideal and effective antenna gains for an antenna of a base station having different antenna array sizes;

FIG. 2 is a graph representing the ideal and effective antenna gains for an antenna of a user equipment having different antenna array sizes;

FIG. 3 represents the effective beamforming gain for a panel-based hybrid beamforming architecture in a line of sight scenario;

FIG. 4 represents the effective beamforming gain for a panel-based hybrid beamforming architecture in a non-line of sight scenario;

FIGS. 5A and 5B graphically represent simulations of a cumulative distribution function (CDF) of base station antenna gain for a single panel and for two panels, respectively;

FIGS. 6A, 6B and 6C are graphical representations of the CDF of downlink serving signal received power (S), the downlink interference (I) and the signal-to-interference-plus-noise ratio (SINR), respectively;

FIGS. 7A and 7B represent the difference in effective gain as compared to a 16×16 array in a line of sight environment and a non-line of sight environment, respectively, FIG. 8 is a block diagram of an apparatus that may be specifically configured in accordance with an example embodiment;

FIG. 9 is a flowchart illustrating operations performed, such as by the apparatus of FIG. 8, in conjunction with a passive antenna array in accordance with an example embodiment;

FIGS. 10A and 10B are graphical representations of the analog beamforming gain for different numbers of antenna elements in line of sight and non-line of sight environments, respectively, FIG. 11 is a graphical representation of an analog beamforming gain as a function of the equivalent isotropic radiated power (EIRP);

FIG. 12 illustrates first and second antenna arrays for line of sight and non-line of sight environments with the arrangement of the first and second antenna arrays having been defined in accordance with an example embodiment;

FIG. 13 is a flowchart illustrating operations performed, such as by the apparatus of FIG. 8, in conjunction with an active antenna array in accordance with an example embodiment;

FIG. 14A illustrates a 16×16 antenna array and FIGS. 14B-14D illustrates three sub-arrays having different arrangements that have been defined in accordance with an example embodiment;

FIG. 15 is a flowchart illustrating operations performed, such as by the apparatus of FIG. 8, in order to estimate the angular spread in accordance with an example embodiment;

FIG. 16 is a flowchart illustrating operations performed, such as by the apparatus of FIG. 8, in order to determine the beamforming gains in accordance with an example embodiment;

FIG. 17 depicts two different sub-array configurations that have been defined in accordance with an example embodiment and that provide for hybrid beamforming with two transceivers; and FIG. 18 depicts three different sub-array configurations that have been defined in accordance with an example embodiment and that provide for hybrid beamforming with four transceivers.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

A method, apparatus and computer program product are provided in accordance with an example embodiment in order to select a plurality of antenna elements of an antenna array. The plurality of antenna elements are selected in order to improve the effective beamforming gain, such as selecting the antenna elements from the antenna array to match the angular spread of signals transmitted and/or received by the antenna array in the particular deployment scenario. Although the method, apparatus and computer program product may be employed in conjunction with a variety of different types of antennas including directional antennas, such as: horn antennas, reflector antennas, plasma antennas, etc.; as well as antennas that are not inherently directional individually, namely, omnidirectional antennas, such as: dipole antennas, monopole antennas, loop antennas, patch antennas, planar inverted-F antennas, inverted-F antennas, etc., in instances in which the omnidirectional antennas are designed to be grouped together to form a directional antenna array; the method, apparatus, and computer program product of an example embodiment will be described hereinafter in conjunction with an antenna array having a plurality of antenna elements, such as a rectangular antenna array. In this regard, the antenna array may include a total of N antenna elements evenly allocated to one or more RF chains, such as an interconnected arrangement of various RF devices, e.g., transmitters, receivers, attenuators, measurement devices, loads, etc. In this example embodiment, the antenna array may include M (M equal to or greater than 1) panels, also known as sub-arrays, each associated with one RF chain (for a total of M RF chains) and including N/M antenna elements arranged in a rectangular or square shape. Thus, each panel of this example embodiment forms a uniform planar array of size ($K_1$, $K_2$) in which:

$$K_1 * K_2 \leq \frac{N}{M}, \tag{5}$$

$K_1=1$ corresponds to a horizontally deployed uniform linear array, while $K_2=1$ indicates a vertically deployed uniform linear array. The nominal beam widths of the antenna elements having a gain of $G_e$ may be represented as $B_{ve}$ and $B_{he}$ in the vertical and horizontal directions, respectively. The ideal RMS beam widths $B_{v0}$ and $B_{h0}$, which are observed in the vertical and horizontal directions, respectively, in free space or an anechoic chamber, of the analog beams formed by each panel of size ($K_1$, $K_2$) can be defined as:

$$B_{v0}=B_{ve}/K_1, \; B_{h0}=B_{he}/K_2. \tag{6}$$

The effective analog beamforming gain for each panel can therefore be determined from the foregoing equation. In this regard, assuming perfect CSI is available for digital beamforming when combining M panels, the effective beamforming gain of the N antenna elements organized into M panels utilizing hybrid beamforming, that is, a combination of analog and digital beamforming, can be defined as:

$$G(N, M, B_{ve}, B_{he}, \sigma_v, \sigma_h) = \frac{2M}{\sqrt{\left(\frac{B_{ve}}{K_1}\right)^2 + \sigma_v^2}\sqrt{\left(\frac{B_{he}}{K_2}\right)^2 + \sigma_h^2}}. \tag{7}$$

Since $G(N, M, B_{ve}, B_{he}, \sigma_v, \sigma_h)$ depends on the panel geometry ($K_1$, $K_2$) subject to the constraint that $K_1*K_2 \leq (N/M)$ and since $B_{ve}$ and $B_{he}$ are determined by the antenna elements as $G_e=2/(B_{ve}*B_{he})$, the panel geometry may be optimized to maximize the effective beamforming gain G subject to the constraint that $$K_1 * K_2 \leq \frac{N}{M}.$$

In this regard, the panel geometry may be optimized as follows:

$$\frac{K_1}{K_2} = \frac{B_{ve} * \sigma_h}{B_{he} * \sigma_v} = \frac{\sigma_h/B_{he}}{\sigma_v/B_{ve}}. \tag{8}$$

Based on the foregoing equations, $K_1$ and $K_2$ may then be defined as:

$$K_1 = \sqrt{\frac{N}{M}\frac{B_{ve}*\sigma_h}{B_{he}*\sigma_v}}, \; K_2 = \sqrt{\frac{N}{M}\frac{B_{he}*\sigma_v}{B_{ve}*\sigma_h}}. \tag{9}$$

The nearest integer pair to ($K_1$, $K_2$) specified by the foregoing equation that satisfies the constraint that $K_1*K_2 \leq N/M$ provides the best beamforming gain. Based on the foregoing equations, the ratio between the optimal RMS azimuth and elevation beam width equals the ratio of the channel RMS spread in azimuth and in elevation as follows:

$$\frac{B_{he}/K_2}{B_{ve}/K_1} = \frac{B_{h0}}{B_{v0}} = \frac{\sigma_h}{\sigma_v}. \tag{10}$$

With reference to the foregoing relationships, the method, apparatus and computer program product of an example embodiment are configured to select the optimal array geometry so as to match the channel angular spread as set forth by equation (8).

In instances in which the channel angular spread, that is, ASD $\sigma_h$ and/or ZSD $\sigma_v$, are unknown or time varying, the effective gain of a rectangular-shaped sub-array can be determined in real time based upon measured signal strength using three or more different sub-array configurations, as described below. For a uniform planar array of size ($N_1$, $N_2$), namely, a uniform planar array having $N_1$ rows and $N_2$ columns, the signal strength of the three sub-panels of size (n1, k1), (n1, k2) and (n2, k1) in which n1, n2≤$N_1$ and k1, k2≤$N_2$ can be measured. The effective gain of the corresponding sub-arrays may be defined as:

$$G(n1, k1, B_{ve}, B_{he}, \sigma_v, \sigma_h) = \frac{2}{\sqrt{\left(\frac{B_{ve}}{n1}\right)^2 + \sigma_v^2} \sqrt{\left(\frac{B_{he}}{k1}\right)^2 + \sigma_h^2}}, \tag{11}$$

$$G(n1, k2, B_{ve}, B_{he}, \sigma_v, \sigma_h) = \frac{2}{\sqrt{\left(\frac{B_{ve}}{n1}\right)^2 + \sigma_v^2} \sqrt{\left(\frac{B_{he}}{k2}\right)^2 + \sigma_h^2}}, \tag{12}$$

$$G(n2, k1, B_{ve}, B_{he}, \sigma_v, \sigma_h) = \frac{2}{\sqrt{\left(\frac{B_{ve}}{n2}\right)^2 + \sigma_v^2} \sqrt{\left(\frac{B_{he}}{k1}\right)^2 + \sigma_h^2}}. \tag{13}$$

The combination of equations 11 and 12 results in the following:

$$\frac{G(n1, k1, B_{ve}, B_{he}, \sigma_v, \sigma_h)}{G(n1, k2, B_{ve}, B_{he}, \sigma_v, \sigma_h)} = \tag{14}$$

$$\frac{G(n1, k1)}{G(n1, k2)} = \frac{\sqrt{\left(\frac{B_{ve}}{n1}\right)^2 + \sigma_v^2} \sqrt{\left(\frac{B_{he}}{k2}\right)^2 + \sigma_h^2}}{\sqrt{\left(\frac{B_{ve}}{n1}\right)^2 + \sigma_v^2} \sqrt{\left(\frac{B_{he}}{k1}\right)^2 + \sigma_h^2}} = \frac{\sqrt{\left(\frac{B_{he}}{k2}\right)^2 + \sigma_h^2}}{\sqrt{\left(\frac{B_{he}}{k1}\right)^2 + \sigma_h^2}},$$

which provides the following:

$$\left[\frac{G^2(n1, k2)}{G^2(n1, k1)} - 1\right]\left(\frac{\sigma_h}{B_{he}}\right)^2 = \frac{1}{(k1)^2} - \frac{G^2(n1, k2)}{(k2)^2 G^2(n1, k1)}, \tag{15}$$

An estimate of the normalized ASD, in its squared form, may then be defined as:

$$\left(\frac{\sigma_h}{B_{he}}\right)^2 = \frac{1/(k1)^2 - G^2(n1, k2)/G^2(n1, k1)/(k2)^2}{G^2(n1, k2)/G^2(n1, k1) - 1}. \tag{16}$$

Similarly, by combining equations (11) and (13), the following equation may be obtained:

$$\left[\frac{G^2(n2, k1)}{G^2(n1, k1)} - 1\right]\left(\frac{\sigma_v}{B_{ve}}\right)^2 = \frac{1}{(n1)^2} - \frac{G^2(n2, k1)}{(n2)^2 G^2(n1, k1)}, \tag{17}$$

from which an estimate of the normalized ZSD, in its squared form, may be obtained as follows:

$$\left(\frac{\sigma_v}{B_{ve}}\right)^2 = \frac{1/(n1)^2 - G^2(n2, k1)/G^2(n1, k1)/(n2)^2}{G^2(n2, k1)/G^2(n1, k1) - 1}. \tag{18}$$

In an instance in which there are additional measurements conducted using different sub-arrays of the antenna array, a pair of estimates for the normalized ASD and ZSD for each sub-array may be obtained with the estimates of the normalized ASD and ZSD for a respective sub-array treated as one realization of equations (15) and (17) for ASD and ZSD, respectively. In an example embodiment, all of the equations formulated using equation (15) will be treated as an over-determined linear system for ASD and all the equations formulated using equation (17) will be treated as an over-determined linear system for ZSD so as to provide the following:

$$\overline{a}\left(\frac{\sigma_h}{B_{he}}\right)^2 \triangleq \begin{bmatrix} a1 \\ \vdots \\ an \end{bmatrix}\left(\frac{\sigma_h}{B_{he}}\right)^2 = \begin{bmatrix} b1 \\ \vdots \\ bn \end{bmatrix} \triangleq \overline{b}, \tag{19}$$

$$\overline{c}\left(\frac{\sigma_v}{B_{ve}}\right)^2 \triangleq \begin{bmatrix} c1 \\ \vdots \\ cl \end{bmatrix}\left(\frac{\sigma_v}{B_{ve}}\right)^2 = \begin{bmatrix} d1 \\ \vdots \\ dl \end{bmatrix} \triangleq \overline{d},$$

in which $a_i$, $b_i$, =1, ... n corresponds to the constants on the left-hand side (LHS) and the right hand side (RHS), respectively, of equation (15), and $c_j$, $b_j$, j=1, ... l corresponds to the LHS and RHS constants, respectively, of equation (17). By applying the classical least-squares estimator, an improved estimation of the normalized ASD and ZSD, in their squared form, may be defined as follows:

$$\left(\frac{\sigma_h}{B_{he}}\right)^2 = \frac{\overline{a}^T \overline{b}}{\overline{a}^T \overline{a}}, \left(\frac{\sigma_v}{B_{ve}}\right)^2 = \frac{\overline{c}^T \overline{d}}{\overline{c}^T \overline{c}}. \tag{20}$$

Although a least squares estimator may be applied, other estimators may similarly be utilized. A legitimate estimate of the squared ASD and ZSD should always be non-negative. However, in some instances, the estimates obtained using equation (16), (18) or (20) may be negative due to estimation noise. In these instances in which the estimate of the squared ASD or ZSD is negative, the estimated negative value may be replaced by a 0. Following the estimate of the normalized ASD and ZSD, in their squared form, the effective gain of a sub-array of size (m1, m2) can be estimated as:

$$G(m1, m2) = G(n1, k1) \frac{\sqrt{\left(\frac{1}{n1}\right)^2 + \frac{\sigma_v^2}{B_{ve}^2}} \sqrt{\left(\frac{1}{k1}\right)^2 + \frac{\sigma_h^2}{B_{he}^2}}}{\sqrt{\left(\frac{1}{m1}\right)^2 + \frac{\sigma_v^2}{B_{ve}^2}} \sqrt{\left(\frac{1}{m2}\right)^2 + \frac{\sigma_h^2}{B_{he}^2}}}. \quad (21)$$

The optimal sub-array shape, that is, the exact values of (m1, m2) can thus be determined based on the requirements of the system, such as the targeted received signal strength and/or the number of users to be supported.

By way of example, the calculated effective beamforming gains as a function of antenna elements in each column of a panel for different numbers of RF chains are depicted in FIGS. 3 and 4 for different environments characterized by different angular spreads of the radio channels. In the antenna arrays of FIGS. 3 and 4, the antenna element gain $G_e$ is 5 dBi, and the ideal gain of an antenna array with 256 antenna elements is 29.1 dBi. There is one transceiver per panel and all panels are identical. In this regard, FIG. 3 depicts the effective beamforming gain for a panel-based hybrid beamforming architecture having 256 antenna elements supported by 1, 2, 4, 8 or 256 RF chains for a 28 GHz UMi street canyon line of sight scenario at 100 meters with a medium ASD of 14° and ZSD of 0.6° as specified by the 3GPP TR 38.901 technical report. Additionally, FIG. 4 represents the effective beamforming gain for a panel-based hybrid beamforming architecture, that is, with 1 RF chain per panel, with 256 antenna elements supported by M=1, 2, 4, 8 or 256 RF chains in a 28 GHz UMa non-line of sight scenario at 100 meters having a medium ASD of 22° and ZSD of 5° as specified by the 3GPP TR 38.901 technical report.

As shown in FIG. 3, an antenna system having 1 RF chain with a 64×4 tall antenna array achieves 1 dB better beamforming gain than an antenna system having 8 RF chains each with a 4×16 fat antenna array, an antenna system having 4 RF chains each with a 8×8 square antenna array or 2 RF chains each with a 16×2 tall antenna array. As such, the antenna array, such as the size and shape of each sub panel, should be matched to the radio channel and the array size should be selected dependent upon the number of RF chains in order to improve the resulting beamforming gain. FIGS. 3 and 4 also illustrate that differently sized subarrays perform better in different environments, such as in a UMa non-line of sight environment which is characterized by larger angular spreads in which one subarray configuration performs better than in a UMi line of sight environment in which a different subarray configuration performs better. Thus, in some embodiments, the antenna sub-array size may be adapted to the particular condition of the radio channel in order to provide the best beamforming gain.

The gain of an optimal sub-array was subjected to system-level simulation using three-dimensional (3D) channel models. The system-level simulation was performed to verify the correctness and accuracy of the optimal sub-array with a full 3D spatial statistical channel model specified by the 3GPP TR 38.901 technical report and an antenna array model with a beamforming algorithm adopted from the 3GPP 5G system evaluation described in the 3GPP TR 38.803 technical report. The simulation assumptions derived from the 3GPP TR 38.803 technical report include a network layout in the form of a fixed cluster circle within a macrocell. In this regard, a micro base station is randomly provided on an edge of the cluster circle. All UEs communicate with a micro base station, that is, a macrocell is only used for determining the position of the micro base station. As a layout of the macrocell, a hexagonal grid is assumed with 19 macro sites and 3 sectors per site with wraparound with an inter site distance (ISD) equal to 200 meters. Other simulation assumptions include three micro base stations per macrocell, that is, three cluster circles in a macrocell with each cluster circle having one micro base station. Additional simulation assumptions include a radius of the UE dropping within a microcell of less than 28.9 meters, a base station antenna height of 10 meters, a UE location of both outdoors and indoors, an indoor UE ratio of 80%, a penetration loss ratio with 50% low loss and 50% high loss, both line of sight and non-line of sight and a UE antenna height which is the same as the 3D-UMi in 3GPP TR 36.873 technical report. Additional simulation assumptions include a uniform UE distribution in a horizontal dimension, a minimum two-dimensional (2D) base station-UE distance of 3 meters, a UMi channel model and a shadow correlation of 0.5.

The simulations initially verified the analytical model of effective antenna gain for the base station transmission in downlink. In this simulation, the foregoing general assumptions are additionally refined to include an ASD of 16°, a ZSD of 1°, a non-line of sight probability of 100%, a base station antenna height and a UE antenna height of 10 meters, a transmit-receive fixed distance of 60 meters, a boresight alignment of the transmit and receive antennas and only the base station antenna gain being simulated. The simulation results are depicted in FIGS. 5A and 5B for a single panel and for two panels, respectively, and are shown below in Table 3.

TABLE 3

| Number of TRX (sub-array) | Optimum/ Not-optimum sub-array | Number of rows in sub-panel (V) | Number of columns in sub-panel (H) | Max ideal Total BF gain (dBi) | Analytical effective Total BF gain [dBi] | Simulated effective Total BF gain [dBi] |
|---|---|---|---|---|---|---|
| 1 | Not-optimum | 8 | 16 | 29.07 | 19.91 | 19.58 |
| 1 | Optimum | 42 | 3 | 29.07 | 24.31 | 24.35 |
| 2 | Not-optimum | 8 | 8 | 29.07 | 22.82 | 22.83 |
| 2 | Optimum | 32 | 2 | 29.07 | 26.10 | 25.85 |

As shown by FIGS. 5A and 5B and in Table 4, the median value of the cumulative distribution function (CDF of the antenna gain) matches the analytical effective antenna gain, both for analog beamforming and hybrid beamforming.

A second set of simulation results examines benefits of the use of a method, apparatus and computer program product of an example embodiment in a real network. In this simulation, the assumptions derived from the 3GPP TR 38.803 technical report for an effective base station antenna array are utilized with the base station antenna array having been modified from an 8×16 array to a 42×3 array and from a 2 panel 8×8 configuration to a 2 panel 32×2 configuration for analog and hybrid beamforming, respectively. For a base station antenna height of 10 meters, a UE antenna height between 1.5 meters and 22.5 meters, and in both LOS and NLOS scenarios for a 3GPP UMi street canyon, the simulation results for the CDF of the downlink (DL) serving signal received power (S), DL downlink interference (I) and DL signal-to-interference-plus-noise (SINR) as a function of S, I and SINR, respectively, are presented in FIGS. 6A-6C, respectively. As shown, the effective antenna configurations, in reference to the configurations assumed by the 3GPP TR 38.803 technical report, permitted the SINR to increase by 6.6 dB and 5.8 dB in conjunction with analog and hybrid beamforming, respectively.

In addition to the foregoing computer simulations, the performance of different antenna array geometries has also been measured. For example, using a 28 GHz 16×16 array as a transmitter, different antenna array geometries we configured by selecting particular antenna elements to be active for transmission. The muted antenna elements for which the amplitude was set to 0 behaved like dummy antenna elements, which have some impact upon the antenna pattern due to electromagnetic coupling from the active antenna elements. However, this impact by the muted antenna elements does not influence the resulting conclusions. In these measurements, a receive (RX) horn antenna was connected to a signal analyser. A transmit signal having a frequency of 100 MHz was then radiated from the antenna array and the channel power was measured upon receipt by the RX horn antenna. For line of sight measurements, panels were utilized as reflectors to create a multipath rich environment with large angular spread in the radio channel. For non-line of sight measurements, the radio wave was reflected from a metal rack and additional panels to increase angular spread.

Since different transmit subarrays have different transmitted power, the difference in beamforming gain is determined by the difference in the received power after having subtracted the difference in the transmitted power. The measured relative gain, using a 16×16 array as a baseline, as well as the estimated gain for both the line of sight and non-line of sight configurations are shown in FIGS. 7A and 7B, respectively. In this regard, FIG. 7A represents the difference in effective gain as compared to a 16×16 array in a line of sight configuration having different sized sub-arrays with the estimation based on an ASD of 4° and a ZSD of 0°. FIG. 7B represents the difference in effective gain as compared to a 16×16 array in a non-line of sight configuration in which the ASD is 27° and the ZSD is 1°. FIGS. 7A and 7B depict the difference in effective antenna gain for different antenna array geometries with different numbers of antenna elements in line of sight and non-line of sight scenarios, respectively. For example, in a line of sight configuration of FIG. 7A, a 16×2 sub-array which has half as many antenna elements as an 8×8 antenna array has similar gain drops as an 8×8 antenna array. In a non-line of sight configuration of FIG. 7B, the effective antenna gain for a 16×4 sub-array is essentially the same as that for a 16×16 antenna array and the effective gain of a 16×2 antenna array is only 2.2 decibels lower than that of a 16×16 antenna array. These examples demonstrate the effectiveness of an optimized antenna array in a real signal channel.

In accordance with an example embodiment, an apparatus 10 is provided to select a plurality of antenna elements of an antenna array, such as to match the angular spread of the antenna array to the deployment scenario, thereby increasing the effective beamforming gain and facilitating the effective use of the antenna array at higher frequencies, such as with millimeter wave frequencies. For example, the apparatus may be configured to select a plurality of antenna elements of an antenna array that facilitate the use of the antenna array to transmit or receive signals having a wavelength between 1 millimeter and 10 centimeters in one embodiment and, more particularly, between 1 millimeter and 1 centimeter in another embodiment. The apparatus may be embodied by any of a variety of computing devices, such as the computing device of a base station or other access point, the computing device of a UE, such as a mobile terminal, e.g., mobile telephone, or the computing device of a portable device, such as customer provided equipment (CPE), a router, a modem, a repeater or a communication module embedded, for example, in a vehicle, an unmanned air vehicle (UAV) or the like. Thus, a device, such as an antenna system, is provided in accordance with an example embodiment that includes a computing device including the apparatus as described above as well as the active antenna array, a base station equipment comprising the active antenna array, user equipment comprising the active antenna array or a portable device comprising the active antenna array.

One example of an apparatus 10 that may be configured to perform the various functions associated with the optimization of an antenna array in accordance with an example embodiment is depicted in FIG. 8. As shown in FIG. 8, the apparatus includes, is associated with or is in communication with processing circuitry 12, a memory 14 and a communication interface 16. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as one or more processors, coprocessors, microprocessors, controllers, digital signal processors (DSP), processing elements with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The method, apparatus 10 and computer program product may be utilized in conjunction with an antenna operating in a passive mode or an antenna operating in an active mode. In the passive mode, the antenna, such as a base station antenna and/or a UE antenna, is configured for the intended deployment scenario of the system. In this regard and with reference now to FIG. 9, the operations performed, such as by an apparatus of the type depicted in FIG. 8, in order to determine an arrangement of antenna elements of an antenna array, such as an antenna array operating in a passive mode, that serves to match the angular spread of the antenna array to the deployment scenario so as to increase the effective beamforming gain, are depicted. In this regard, the apparatus, such as the processing circuitry 12, is configured to determine first and second dimensions of the arrangement of antenna elements. The first and second dimensions may be differently defined depending upon the arrangement. In an example embodiment in which the antenna array is a rectangular arrangement of antenna elements, the first dimension represents a number of rows of the arrangement, while the second dimension represents a number of columns of the arrangement.

As shown in block 20, the apparatus 10 includes means, such as the processing circuitry 12 or the like, configured to determine a first dimension of the arrangement in terms of a number of antenna elements $K_1$ based on a total number N of antenna elements of the antenna array, a number M of RF chains, a nominal bandwidth of the antenna array, such as $B_{ve}$ and $B_{he}$, in the vertical and horizontal directions, respectively, and an angular spread, such as an azimuth angular spread ASD as represented by $\sigma h$ and an elevation angular spread ZSD as represented by $\sigma_v$. The parameters upon which $K_1$ is based may be stored, for example, by the memory 14. In an example embodiment, the apparatus, such as the processing circuitry, is configured to determine the first dimension of the arrangement in terms of the number $K_1$ of antenna elements based upon equation (9) as set forth above.

As shown in block 22, the apparatus 10 of this example embodiment also includes means, such as the processing circuitry 12 or the like, configured to determine a second dimension of the arrangement of antenna element in terms of a number $K_2$ of antenna elements based on the first dimension, the total number N of the antenna elements of the antenna array and the number M of RF chains. In an example embodiment, the apparatus, such as the processing circuitry, is configured to determine the second dimension of the arrangement in terms of the number $K_2$ of antenna elements based upon equation (5) as set forth above, such as by defining the number $K_2$ of antenna elements to be the largest integer that satisfies equation (5). In this example embodiment, the apparatus also includes means, such as the processing circuitry or the like, configured to determine an effective gain G1 of the arrangement of the antenna elements having the first and second dimensions, that is, for a sub-array of size ($K_1$, $K_2$). See block 24. In an example embodiment, the apparatus, such as the processing circuitry, is configured to determine the effective gain of the sub-array utilizing equation (7) as set forth above.

In an example embodiment depicted in FIG. 9, the apparatus 10, such as the processing circuitry 12, is configured to repeat the foregoing process, albeit by first determining the second dimension of the arrangement and subsequently determining the first dimension. See blocks 26 and 28. In this example embodiment, the apparatus includes means, such as the processing circuitry or the like, for determining another second dimension of the arrangement in terms of a number $K_2'$ of antenna elements based on the total number N of the elements of the antenna array, the number M of RF chains, the nominal bandwidth of the antenna elements, such as $B_{ve}$ and $B_{he}$, in the vertical and horizontal directions, respectively, and an angular spread, such as an azimuth angular spread ASD $\sigma_h$ and an elevation angular spread ZSD $\sigma_v$. The apparatus of this example embodiment also includes means, such as the processing circuitry or the like, configured to determine another first dimension of the arrangement in terms of a number $K_1'$ of antenna elements based on the another second dimension, the total number N of the antenna elements of the antenna array and the number M of RF chains. As before, the another first dimension and the another second dimension may be differently defined depending upon the arrangement and, in an example embodiment in which the antenna array is a rectangular arrangement of antenna elements, the another first dimension may represent a number of rows of the arrangement, while the another second dimension may represent a number of columns of the arrangement. The apparatus of this example embodiment also includes means, such as the processing circuitry or the like, configured to determine another effective gain G2 of the arrangement of the antenna elements having the another first dimension the another second dimension, such as in accordance with equation (7) set forth above. See block 30.

The apparatus 10 of an example embodiment also includes means, such as the processing circuitry 12 or the like, configured to determine the arrangement of the antenna elements of the antenna array based on the effective gain and, in the embodiment in which both an effective gain of the arrangement of antenna elements having the first and second dimensions and another effective gain of the arrangement of antenna elements having the another first dimension and the another second dimension have been determined, to determine the arrangement of the antenna elements of the antenna array based on the effective gain and the another effective gain. See block 32. In this example embodiment, the apparatus, such as the processing circuitry, is configured to determine that the arrangement of the antenna elements of the antenna array for which the effective gain is largest is the arrangement of antenna elements that should be utilized for the sub-array in the passive mode. Thus, in an instance in which the effective gain G1 of the arrangement of the antenna elements having the first and second dimensions is greater than or equal to the another effective gain G2 of the arrangement of the antenna elements having the another first and second dimensions, the apparatus, such as the processing circuitry, is configured to determine that the arrangement of antenna elements having the first and second dimension is to be utilized for the sub-array. However, in an instance in which the apparatus, such as the processing circuitry, determines that the another effective gain G2 of the arrangement of the antenna elements having the another first and second dimensions is greater than the effective gain G1 of the arrangement of the antenna element having the first and second dimensions, the apparatus, such as the processing circuitry, is configured to determine that the arrangement of the antenna elements having the another first and second dimensions is to be utilized for the sub-array.

For antenna arrays having the same number N of antenna elements, the arrangement of the antenna elements that are utilized for a sub-array can be chosen in accordance with an example embodiment so as to improve the effective beamforming gain and, thus, the signal strength, such as by 2 to 3 dB relative to traditional square arrays in an urban micro street canyon deployment as shown in FIGS. 10A and 10B, with analog beamforming, that is, M=1, and an antenna element gain of 5 dBi. In the context of FIGS. 10A and 10B, the optimal gain and array shape is depicted as a function of array size for an urban micro street canyon in a non-line of sight configuration in which the ASD is 15.6° and the ZSD is 0.8° and in a line of sight configuration in which the ASD is 13.7° and the ZSD is 0.6°, respectively. In this regard, the optimal array geometry is defined in accordance with an example embodiment, such as in the manner described above in conjunction with FIG. 9, and the corresponding effective beamforming gain is determined in accordance with equation (7).

For an antenna system having a strict equivalent isotropic radiated power (EIRP) limit, such as an indoor access point or CPE, the determination of the arrangement of antenna elements of the antenna array to be utilized by a sub-array in accordance with an example embodiment can improve the effective beamforming gain and, thus, the signal strength, such as by 3 to 4 dB under the same EIRP limit as shown in FIG. 11 with an antenna element gain of 5 dBi, a per antenna element transmit power of 10 dBm, an ASD of 39.8° and a ZSD of 1.4° as defined in accordance with the specifications in 3GPP TR 38.901 technical report. In this example embodiment, the apparatus 10, such as the processing circuitry 12, may be configured to determine the maximum number N of antenna elements based on the EIRP as:

$$N \leq 10^{0.05*(EIRP-Pt-Ge)}$$

in which EIRP is expressed in dBm, Pt is the per antenna element transmit power in dBm and $G_e$ is the per-antenna element gain in dBi. With respect to the effective gain of an optimal sub-array as shown in FIG. 11 relative to an effective gain of a squared array and relative to the nominal gain of the antenna array in an anechoic chamber, the method, apparatus and computer program product of an example embodiment can determine the optimal array geometry with reference to equation (9) and the corresponding effective beamforming gain with reference to equation (7).

Although described above in conjunction with a rectangular antenna array, the method, apparatus and computer program product as represented by the flowchart of FIG. 9 may be utilized in conjunction with other types of directional antennas, such as a horn antenna, reflector antenna, a plasma antenna or the like, with the arrangement of antenna element being determined by optimizing the beam width of the directional antenna in azimuth and elevation so as to maximize the effect of antenna gain in the radio channel.

In some embodiments, different arrangements of antenna elements may be determined to improve the effective beamforming gain for different configurations, such as with one arrangement of antenna elements determined to provide the best performance in conjunction with a line of sight configuration and a different arrangement of antenna elements determined to provide the best performance in conjunction with a non-line of sight configuration. In a non-line of sight configuration, the azimuth angular spread is larger than in a line of sight configuration such that the antenna array for the non-line of sight configuration may be differently shaped relative to the antenna array for a line of sight configuration in order to improve the strength of the receive signal as compared to reception by a square antenna array that may be utilized for line of sight configurations. However, a square antenna array may be selected in conjunction with a line of sight configuration which is characterized by stronger signal strength since the square antenna array is generally better for interference mitigation in the horizontal plane. As shown, for example, in FIG. 12, a square antenna array 40, such as a 16×16 antenna array, may be determined to be the optimal arrangement for a line of sight configuration, while a 32×8 antenna array 42 may be determined to be the optimal sub-array for a non-line of sight configuration. The different configurations of the antenna array used for line of sight and non-line of sight configurations may include different combinations of antenna elements from the same larger antenna array (with some of the same antenna elements optionally being included in each of the different configurations), or may be comprised of entirely different antenna arrays, as shown in FIG. 12.

As shown in FIG. 12, after defining the different sub-arrays 40, 42, a transceiver 44 may be switchably connected to the different sub-arrays with the position of the switch dependent upon the configuration in which the antenna array is to operate, such as in a line of sight or non-line of sight configuration. The configuration may be determined in various manners, but, in one embodiment, the apparatus 10, such as the processing circuitry 12, is configured to monitor the signal strength of signals received from the UE and to identify that the UE has moved from a line of sight configuration to a non-line of sight configuration in response to determining a reduction in the signal strength that exceeds a predetermined threshold. The non-line of sight configuration is not only associated with movement from an outdoor environment to an indoor environment, but also could occur in conjunction with other types of beam blockage. Upon detection a reduction in signal strength indicative of a transition to a non-light of sight configuration (regardless of the type of non-line of sight configuration), the apparatus, such as the processing circuitry, is configured to direct the switch to be moved from a first position in which the transceiver is connected to the 16×16 square antenna array that was utilized for a line of sight configuration to a second position as shown in FIG. 12 in which the transceiver is connected to the 32×8 antenna array for use in conjunction with a non-line of sight configuration. Similarly, the apparatus, such as the processing circuitry, of an example embodiment is configured to detect a transition from a non-line of sight configuration to a line of sight configuration in an instance in which the signal strength from the UE increases by at least the predetermined threshold and to correspondingly direct that the switch be repositioned, such as from the second position in which the transceiver is connected to the 32×8 antenna array to the first position in which the transceiver is connected to the 16×6 antenna array.

In addition to or as an alternative to the selection of antenna elements of a passive antenna array, the method, apparatus 10 and computer program product of an example embodiment may be employed in conjunction with the selection of a plurality of antenna elements of an active antenna array. In this regard, an active antenna array may be utilized by a base station or a UE with the arrangement of antenna elements, that is, a sub-array, being automatically adopted for a specific channel condition. The arrangement of the sub-array of antenna elements, such as in terms of the number of antenna elements in the horizontal and vertical directions, that are connected to one or more transceivers may be based on the measured signal strength from at least three different sub-array shapes. In general, the method, apparatus and computer program product of this example embodiments provide for signal strength measurement, angular spread estimation, sub-array selection and sub-array and transceiver pair connections and activation. Further details are provided, for example, in conjunction with the flowchart of FIG. 13, which depicts the operations performed, for example, by an apparatus of the type depicted in FIG. 8.

As shown in block 50, the apparatus 10 of this example embodiment includes means, such as the processing circuitry 12 or the like, configured to select a first plurality of antenna elements and to obtain a measure of a first signal based upon transmission or reception of a signal by the first plurality of antenna elements. Likewise, the apparatus includes means, such as the processing circuitry or the like, configured to select a second plurality of antenna elements and to obtain a measure of a second signal based upon transmission or reception of a signal by the second plurality of antenna elements. See block 52. Further, the apparatus includes means, such as the processing circuitry or the like, configured to select a third plurality of antenna elements and to obtain a measure of a third signal based upon the transmission and reception of a signal by the third plurality of antenna elements. See block 54. In an embodiment in which the apparatus is associated with the antenna that transmits the signals, e.g., downlink signals, the signals may be received by and the strength of the received signals may be measured by a receiving antenna. Values representative of the strength of the signals received by a receiving antenna may then be provided to the apparatus for subsequent processing as described herein. Alternatively, in an embodiment in which the apparatus is associated with the antenna that receives the signals, e.g., uplink signals, the signals may be received by the antenna and the strength of the received signals may be measured by the apparatus, such as the processing circuitry, to facilitate the subsequent processing as described herein.

The first, second and third plurality of antenna elements are each different selections of the plurality of antenna elements of an active sub-array. For example, FIG. 14A depicts a square antenna array having a size of 16×16 antenna elements. The first, second and third pluralities of antenna elements forming first, second and third sub-arrays, respectively, are selected from the antenna array as represented by the darker antenna elements of FIGS. 14B-14D with the first sub-array of FIG. 14B defined to have a size of 4×8, the second sub-array of FIG. 14C defined to have a size of 4×16 and the third sub-array of FIG. 14D defined to have a size of 16×8. As shown, each of the three sub-arrays are defined by a contiguous portion of the antenna elements of the overall antenna array, but each of the first, second and third sub-arrays are different from one another in terms of their respective dimensions and, as a result, different in at least some of the antenna elements that form each of the sub-arrays. In an example embodiment, the respective sub-arrays are defined by applying an amplitude of 0 to the antenna elements that are to be switched off and are not to be included in the respective sub-array, while applying a non-zero amplitude to the antenna elements that are to be included in the respective sub-array. In other embodiments, however, the antenna elements of a respective sub-array need not be contiguous, but may, instead be non-contiguous or spaced apart from other antenna elements of the same sub-array, such as by one or more antenna elements that are switched off.

The apparatus 10 of an example embodiment also includes means, such as the processing circuitry 12 or the like, configured to process the measures of the first, second and third signals, such as by estimating an angular spread of the respective signals. See block 56. In an embodiment in which the first, second and third pluralities of antenna elements are defined as sub-arrays of size (n1, k1) (n1, k2) and (n2, k1), respectively, in which n1, n2≤$N_1$ and k1, k2≤$N_2$, the measured signal strength of sub-array (n, k) is denoted by Pr (n, k) and the transmit power is denoted as Pt (n, k) in a decibel scale, e.g., dBm. In this example embodiment and as shown in FIG. 15, the apparatus, such as the processing circuitry, may be configured to estimate the angular spread by determining the beamforming gains based upon the measures of the first, second and third signals (see block 60), and by estimating at least one of an azimuth angular spread or an elevational angular spread of the signal based at least in part upon the beamforming gains (see block 62). In an example embodiment depicted in FIG. 16, the apparatus, such as the processing circuitry, is configured to determine the beamforming gains by determining a first signal strength value based on a difference in received signal strength between the second signal and the first signal and also based on the difference in transmitted signal strength between the second signal and the first signal. See block 70. For example, in an instance in which the signal associated with the sub-array (n1, k1) is the first signal and serves as a baseline, the apparatus, such as the processing circuitry, is configured to determine the first signal strength value G_dB (n1, k2) as set forth below.

$$G\_dB(n1,k2)=Pr(n1,k2)-Pr(n1,k1)-(Pt(n1,k2)-Pt(n1,k1)); \quad (22a)$$

The apparatus 10 of this example embodiment also includes means, such as the processing circuitry 12 or the like, configured to convert the first signal strength value to a first relative beamforming gain. See block 72. In the foregoing example embodiment, the apparatus, such as the processing circuitry, is configured to convert the first signal strength value G(n1, k2) to a first, relative beamforming gain as follows:

$$G(n1,k1)=10^{0.1*G\_dB(n1,k2)} \quad (23a)$$

In this example embodiment, the apparatus 10 also includes means, such as the processing circuitry 12 or the like, configured to determine a second signal strength value based on a difference in received signal strength between the third signal and the first signal and also based on the difference in transmitted signal strength between the third signal and the first signal. See block 74. In conjunction with the foregoing embodiment in which the signals associated with sub-array (n1,k1) are the first signals that serve as the baseline, the apparatus, such as the processing circuitry, is configured to determine the second signal strength G_dB (n2, k1) as follows:

$$G\_dB(n2,k1)=Pr(n2,k1)-Pr(n1,k1)-(Pt(n2,k1)-Pt(n1,k1)); \quad (22b)$$

Further, the apparatus 10 of this example embodiment includes means, such as the processing circuitry 12 or the like, configured to convert the second signal strength value to a second relative beamforming gain. See block 76. In this regard, the apparatus, such as the processing circuitry, is configured to convert the second signal strength value G (n2, k1) to a second relative beamforming gain as follows:

$$G(n2,k1)/G(n1,k1)=10^{0.1*G\_dB(n2,k1)} \quad (23b)$$

As noted above, the apparatus 10 of this example embodiment also includes means, such as the processing circuitry 12 or the like, configured to estimate at least one of an azimuth angular spread or elevational angular spread and, in one embodiment, both an azimuth angular spread and an elevational angular spread based at least in part upon the beamforming gains. See block 62 of FIG. 15. In conjunction with the foregoing example embodiment, the apparatus, such as the processing circuitry, is configured to estimate the normalized ASD by applying the first relative beamforming gain, that is, by applying the value of G (n1, k2)/G(n1, k1), to equation (16) and to estimate the normalized ZSD by applying the second relative beamforming gain, that is, by applying the value of G (n2, k1)/G (n1, k1), to equation (18). In an instance in which there are multiple signal strength measurements, the apparatus, such as the processing circuitry, may improve the estimates of ASD and ZSD by application of equations (19) and (20) as described above.

As shown in block 58 of FIG. 13, the apparatus 10 of this example embodiment also includes means, such as the processing circuitry 12 or the like, configured to determine a sub-array of antenna elements of the active antenna array to be utilized based on the processing of the measures of the first, second and third signals. In an example embodiment in which a sub-array of size (k1, k2) is to be selected, the apparatus, such as the processing circuitry, is configured to determine the optimal ratio k1/k2 in accordance with equation (8) and to estimate the effective gain utilizing equation (21). The apparatus, such as the processing circuitry, is also configured to determine the product k1*k2 based on the desired receive signal strength. The apparatus, such as the processing circuitry, is then configured to repeat the foregoing process, such as the process shown in FIG. 13 and described above, for each transceiver that is configured to serve a different data stream or a different UE with different ASD and ZSD values.

In an embodiment in which all of the sub-array selections for all of the transceivers may be accommodated by the antenna-array, each transceiver is then connected to the respective sub-array and the antenna system is activated. Alternatively, if all of the sub-array selections cannot be accommodated by the antenna array, the size of one or more sub-arrays and/or the number of serving transceivers may be reduced until the antenna array can accommodate all of the selected sub-arrays, as modified. By way of example, FIGS. 17 and 18 depict optimum sub-array configurations in the case of hybrid beamforming with two transceivers in FIG. 17 and four transceivers in FIG. 18 following angular spread changes in the respective propagation environments. In these example embodiments, the sub-array can be configured to have any geometry as determined in accordance with the foregoing process by connecting the blocks of a smaller sub-array. For example, the antenna arrays of FIGS. 17 and 18 include a plurality of 4×4 sub-arrays that can be connected in various manners to form antenna sub-arrays having the desired arrangement of antenna elements.

In this regard, sub-array configuration 1 in FIG. 17 in which the transceivers 1 and 2 are operably connected to the left and right halves of the antenna array, respectively, could be selected when both UEs, that is, the UE communicating via transceiver 1 and the UE communicating via transceiver 2, are in a non-line of sight configuration or are in indoor locations in which a large angular spread is measured. Conversely, sub-array configuration 2 of FIG. 17 in which transceivers 1 and 2 are operably connected to the lower and upper halves of the antenna array, respectively, could be selected when both UEs are in a line of sight configuration having a smaller angular spread and the UEs are close to each other in azimuth so that the sub-array may be shorter and wider, e.g., fat, for better interference control. In relation to the embodiment depicted in FIG. 18 having hybrid beamforming with four transceivers to serve four UEs simultaneously, sub-array configuration 1 in which the transceivers 1, 2, 3 and 4 are operably connected to the two leftmost columns of antenna elements, the two left center columns of antenna elements, the two right center columns of antenna elements and the two rightmost columns of antenna elements, respectively, may be selected in an instance in which all four UEs are in a non-line of sight configuration, which is identified by measurement of a high angular spread in azimuth. However, in an instance in which all four UEs are in the line of sight configuration, sub-array configuration 2 in which the transceivers 1, 2, 3 and 4 are operably connected to the upper left quadrant of antenna elements, the upper right quadrant of antenna elements, the lower left quadrant of antenna elements and the lower right quadrant of antenna elements, respectively, could be selected as a result of a measured low angular spread. Further, sub-array configuration 3 of FIG. 18 in which transceivers 1 and 2 are operably connected to the upper left and lower left quadrants of antenna elements, respectively, and transceivers 3 and 4 are operably connected to the two right center columns of antenna elements and the two rightmost antenna elements, respectively, may be selected when some of the UEs, such as two UEs, are in a line of sight configuration and other UEs, such as two other UEs, are in non-line of sight configurations.

The apparatus 10 of an example embodiment may be embodied in a variety of computing devices as described above including a computing device of an access point or a UE. By way of example, the apparatus may be embodied by a reconfigurable antenna (sub)-array unit or an optimal antenna processing unit, both of which include respective processing circuitry. In this example embodiment, the optimal antenna processing unit may be located in the central processing unit (CPU)/baseband (BB) portion of an access point or a UE and is configured to receive power measurements of uplink reference signals or to collect downlink receive power reports, to estimate the azimuth and elevation angular spread, to calculate the optimal antenna array/sub-array and/or to provide reconfiguration control signals to the reconfigurable antenna sub-array unit. The reconfigurable antenna sub-array unit of this example embodiment may be located in the antenna/RF portion of the access point or UE and is configured to provide for reconfiguration of the array/sub-array based on the control system from the optimal antenna processing.

A method, apparatus 10 and computer program product are therefore provided in order to select a plurality of antenna elements of an antenna array. In an example embodiment, the antenna elements are selected so as to match the angular spread of the antenna array to the deployment scenario. By matching the angular spread to the deployment scenario, the effective beamforming gain will be increased, thereby facilitating the effective use of the antenna array at higher frequencies, such as with millimeter wave frequencies, while continuing to provide for a relatively high user rate and without appreciable shrinking of the traditional cell coverage range. Indeed, while described herein in conjunction with the use of the antenna array with millimeter wave frequencies, the antenna array may be used in any of a wide variety of other frequency bands including lower frequency bands, e.g., 100 MHz, or higher frequency bands, e.g., 100 GHz.

FIGS. 9, 13, 15 and 16 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 12 of an apparatus employing an embodiment of the present invention and executed by a processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, the functions described above in conjunction with one or more blocks of the flowcharts may be omitted and/or performed in a different order in other embodiments. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for selecting a plurality of antenna elements of an active antenna array, the method comprising:
   selecting a first plurality of antenna elements and obtaining a measure of a first signal based upon transmission or reception of a signal by the first plurality of antenna elements;
   selecting a second plurality of antenna elements and obtaining a measure of a second signal based upon transmission or reception of a signal by the second plurality of antenna elements;
   selecting a third plurality of antenna elements and obtaining a measure of a third signal based upon transmission or reception of a signal by the third plurality of antenna elements, wherein the first, second and third plurality of antenna elements are each different selections of the plurality of antenna elements of the active antenna array;

processing the measures of the first, second and third signals; and determining a subarray of antenna elements of the active antenna array to be utilized based on the processing of the measures of the first, second and third signals.

2. A method according to claim 1 wherein processing the measures of the first, second and third signals comprises estimating an angular spread of the signal.

3. A method according to claim 2 wherein estimating the angular spread comprises:

determining beamforming gains based upon the measures of the first, second and third signals; and estimating at least one of an azimuth angular spread or an elevational angular spread of the signal based at least in part upon the beamforming gains.

4. A method according to claim 3 wherein determining beamforming gains comprises:

determining a first signal strength value based on a difference in received signal strength between the second signal and the first signal and also based on a difference in transmitted signal strength between the second signal and the first signal;

converting the first signal strength value to a first relative beamforming gain;

determining a second signal strength value based on a difference in received signal strength between the third signal and the first signal and also based on a difference in transmitted signal strength between the third signal and the first signal; and converting the second signal strength value to a second relative beamforming gain.

5. A method according to claim 1 wherein selecting the first, second and third pluralities of antenna elements comprises selecting three different subarray configurations from an array of antenna elements.

6. An apparatus configured to select a plurality of antenna elements of an active antenna array, the apparatus comprising at least one processor and at least one memory including computer program code for one or more programs, the at least one memory and the computer program code configured to, with the at least one processor, cause the apparatus at least to:

receive a measure of a first signal based upon transmission or reception of a signal by a first plurality of antenna elements;

receive a measure of a second signal based upon transmission or reception of a signal by a second plurality of antenna elements;

receive a measure of a third signal based upon transmission or reception of a signal by a third plurality of antenna elements, wherein the first, second and third plurality of antenna elements are each different selections of the plurality of antenna elements of the active antenna array;

process the measures of the first, second and third signals; and determine a subarray of antenna elements of the active antenna array to be utilized based on the processing of the measures of the first, second and third signals.

7. An apparatus according to claim 6 wherein the at least one memory and the computer program code are configured to, with the at least one processor, cause the apparatus to process the measures of the first, second and third signals by estimating an angular spread of the signal.

8. An apparatus according to claim 7 wherein the at least one memory and the computer program code are configured to, with the at least one processor, cause the apparatus to estimate the angular spread by:

determining beamforming gains based upon the measures of the first, second and third signals; and estimating at least one of an azimuth angular spread or an elevational angular spread of the signal based at least in part upon the beamforming gains.

9. An apparatus according to claim 8 wherein the at least one memory and the computer program code are configured to, with the at least one processor, cause the apparatus to determine beamforming gains by:

determining a first signal strength value based on a difference in received signal strength between the second signal and the first signal and also based on a difference in transmitted signal strength between the second signal and the first signal;

converting the first signal strength value to a first relative beamforming gain;

determining a second signal strength value based on a difference in received signal strength between the third signal and the first signal and also based on a difference in transmitted signal strength between the third signal and the first signal; and converting the second signal strength value to a second relative beamforming gain.

10. A device comprising the apparatus of claim 6 and at least one of the active antenna array, a base station equipment comprising the active antenna array, a user equipment comprising the active antenna array or a portable device comprising the active antenna array.

11. An apparatus according to claim 6 wherein the at least one memory and the computer program code are configured to, with the at least one processor, cause the apparatus to select the first, second and third pluralities of antenna elements by selecting three different subarray configurations from an array of antenna elements.

12. An antenna system comprising:

an antenna array comprising a plurality of antenna elements;

processing circuitry configured to:

receive a measure of a first signal based upon transmission or reception of a signal by a first plurality of antenna elements;

receive a measure of a second signal based upon transmission or reception of a signal by a second plurality of antenna elements;

receive a measure of a third signal based upon transmission or reception of a signal by a third plurality of antenna elements, wherein the first, second and third plurality of antenna elements are each different selections of the plurality of antenna elements of the antenna array;

process the measures of the first, second and third signals; and determine a subarray of antenna elements of the antenna array to be utilized based on the processing of the measures of the first, second and third signals; and a receiver or a transmitter connected to the subarray of antenna elements and configured to receive or transmit signals, respectively.

13. An antenna system according to claim 12 wherein the processing circuitry is configured to process the measures of the first, second and third signals by estimating an angular spread of the signal.

14. An antenna system according to claim 13 wherein the processing circuitry is configured to estimate the angular spread by:
- determining beamforming gains based upon the measures of the first, second and third signals; and
- estimating at least one of an azimuth angular spread or an elevational angular spread of the signal based at least in part upon the beamforming gains.

15. An antenna system according to claim 14 wherein the processing circuitry
- is configured to determine beamforming gains by:
- determining a first signal strength value based on a difference in received signal strength between the second signal and the first signal and also based on a difference in transmitted signal strength between the second signal and the first signal;
- converting the first signal strength value to a first relative beamforming gain;
- determining a second signal strength value based on a difference in received signal strength between the third signal and the first signal and also based on a difference in transmitted signal strength between the third signal and the first signal; and
- converting the second signal strength value to a second relative beamforming gain.

16. An antenna system according to claim 12, further comprising a base station equipment, a user equipment or a portable device that comprises the antenna array.

17. A method for determining an arrangement of antenna elements of an antenna array, the method comprising:
- determining a first dimension of the arrangement in terms of a number of antenna elements based on a total number of the antenna elements of the antenna array, a number of radio frequency chains, a nominal beamwidth of the antenna elements and an angular spread;
- determining a second dimension of the arrangement in terms of a number of antenna elements based on the first dimension, the total number of the antenna elements of the antenna array and the number of radio frequency chains;
- determining an effective gain of the arrangement of the antenna elements having the first and second dimensions; and
- determining the arrangement of the antenna elements of the antenna array based on the effective gain.

18. A method according to claim 17 further comprising:
- determining another second dimension of the arrangement in terms of a number of antenna elements based on the total number of the antenna elements of the antenna array, the number of radio frequency chains, the nominal beamwidth of the antenna elements and the angular spread;
- determining another first dimension of the arrangement in terms of a number of antenna elements based on the another second dimension, the total number of the antenna elements of the antenna array and the number of radio frequency chains; and
- determining another effective gain of the arrangement of the antenna elements having the another first and second dimensions,
- wherein determining the arrangement of the antenna elements of the antenna array comprises determining the arrangement of the antenna elements of the antenna array based on the effective gain and the another effective gain.

19. A method according to claim 18 wherein the first dimension and the another first dimension represent a number of rows of the arrangement, and wherein the second dimension and the another second dimension represent a number of columns of the arrangement.

20. A method according to claim 18 wherein determining the arrangement of the antenna elements of the antenna array based on the effective gain and the another effective gain comprises identifying the arrangement for which the effective gain or the another effective gain is largest.

* * * * *

UNITED STATES PATENT AND TRADEMARK OFFICE
CERTIFICATE OF CORRECTION

PATENT NO. : 11,962,097 B2
APPLICATION NO. : 17/603716
DATED : April 16, 2024
INVENTOR(S) : Jinfeng Du et al.

Page 1 of 1

It is certified that error appears in the above-identified patent and that said Letters Patent is hereby corrected as shown below:

On the Title Page

In Column 2, item (57), ABSTRACT, Line 13, delete "sub-army" and insert -- sub-array --, therefor.

Signed and Sealed this
Nineteenth Day of November, 2024

Katherine Kelly Vidal
*Director of the United States Patent and Trademark Office*